United States Patent
Kim et al.

(10) Patent No.: US 11,409,746 B2
(45) Date of Patent: Aug. 9, 2022

(54) METHOD AND APPARATUS FOR PROCESSING QUERY USING N-ARY JOIN OPERATORS

(71) Applicant: Daegu Gyeongbuk Institute of Science and Technology, Daegu (KR)

(72) Inventors: Min-Soo Kim, Seongnam-si (KR); Yoon Min Nam, Daegu (KR); Sung Jin Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 17/093,724

(22) Filed: Nov. 10, 2020

(65) Prior Publication Data

US 2021/0149897 A1    May 20, 2021

(30) Foreign Application Priority Data

Nov. 18, 2019   (KR) .................. 10-2019-0147583

(51) Int. Cl.
*G06F 16/2455* (2019.01)
*G06F 16/22* (2019.01)
(Continued)

(52) U.S. Cl.
CPC ........ *G06F 16/2456* (2019.01); *G06F 16/221* (2019.01); *G06F 16/2282* (2019.01);
(Continued)

(58) Field of Classification Search
CPC ............... G06F 16/2456; G06F 16/221; G06F 16/2282; G06F 16/2428; G06F 16/24532; G06F 16/24535; G06F 16/24542
See application file for complete search history.

(56) References Cited

U.S. PATENT DOCUMENTS 8,676,865 B2 *  3/2014  Han .................... G06F 16/9024
                                                                  707/808
9,116,955 B2    8/2015  Schechter et al.
(Continued)

FOREIGN PATENT DOCUMENTS

KR    10-2009-0044463    5/2009
KR    10-1862779         5/2018
(Continued)

OTHER PUBLICATIONS

KIPO, Notice of Allowance of Application No. 10-2019-0147583, dated Oct. 28, 2020.

*Primary Examiner* — Dangelino N Gortayo
(74) *Attorney, Agent, or Firm* — Lex IP Meister, PLLC

(57) ABSTRACT

A method of processing database queries according to an embodiment of the disclosure includes the steps of acquiring an input query of a database, generating a join graph consisting of vertexes corresponding to the tables of the database and edges corresponding to join information among the tables, dividing the join graph into a plurality of subgraphs, and for the input query, generating an execution plan of a target query including N-ary join operators by using the plurality of subgraphs, optimizing the execution plan of the target query based on a cost model, acquiring a table sort algorithm of the N-ary join operators included in the target query based on an available size of a GPU or CPU memory, determining a sort order of one or more join columns included in the tables of the N-ary join operators, and based on the sort order of the one or more join columns, performing an operation for the plurality of subgraphs.

20 Claims, 17 Drawing Sheets

(51) Int. Cl.
*G06F 16/242* (2019.01)
*G06F 16/2453* (2019.01)

(52) U.S. Cl.
CPC .... *G06F 16/2428* (2019.01); *G06F 16/24532* (2019.01); *G06F 16/24535* (2019.01); *G06F 16/24542* (2019.01)

(56) References Cited

U.S. PATENT DOCUMENTS

| | | | |
|---|---|---|---|
| 2012/0246146 A1* | 9/2012 | Lee | G06F 16/24568 707/E17.017 |
| 2017/0004173 A1* | 1/2017 | Simitsis | G06F 16/24542 |
| 2018/0268009 A1* | 9/2018 | Desai | G06F 16/2455 |
| 2019/0197161 A1* | 6/2019 | Rajan | G06F 16/24542 |
| 2019/0347261 A1* | 11/2019 | Ruiz | G06F 16/24537 |

FOREIGN PATENT DOCUMENTS

| | | |
|---|---|---|
| KR | 10-1915591 | 1/2019 |
| KR | 10-1955376 | 3/2019 |

* cited by examiner

FIG. 15

| SYMBOL | MEANING |
|---|---|
| $p_i$ | FILTERING PREDICATES OF THE TABLE $R_i$ |
| $F_i$ | RESULT TABLE OF APPLYING $p_i$ TO $R_i$ |
| $f_i$ | SELECTIVITY OF $p_i$ ($0 \leq f_i \leq 1$, 0 MEANS THAT ALL TUPLES DID NOT SATISFY $p_i$, 1 MEANS THAT ALL TUPLES SATISFY $p_i$) |
| $dup_i$ | AVERAGE VALUE OF THE TUPLE NUMBERS HAVING THE SAME HASH KEY VALUES IN THE HASH CABLE OF $F_i$ |
| $u(w)$ | NUMBER OF TABLES RELATED TO THE JOIN VARIABLE W |
| $N_{min}^{w}$ | MINIMUM NUMBER AMONG TUPLE NUMBERS OF THE JOIN SUBTREE S (1),... |
| $N_{max}^{w}$ | MAXIMUM NUMBER AMONG TUPLE NUMBERS OF THE JOIN SUBTREE S (1),... |
| $k$ | NUMBER OF REPETITIVELY SCANNING A TABLE TO BUILD A HASH TABLE |

METHOD AND APPARATUS FOR PROCESSING QUERY USING N-ARY JOIN OPERATORS

CROSS-REFERENCE TO RELATED APPLICATION(S)

This application is based on and claims priority under 35 U.S.C. § 119(a) of a Korean patent application number 10-2019-0147583, filed on Nov. 18, 2019, in the Korean Intellectual Property Office, the disclosure of which is incorporated by reference herein in its entirety.

BACKGROUND

1. Field

The disclosure relates to a method of processing queries of a database, and more particularly, to a method of generating a query execution plan for processing queries swiftly by using N-ary join operators, and an apparatus therefor.

2. Description of Related Art

As a query processing technology of a relational database is utilized in various fields, processing of queries in more complex forms is being required. In particular, queries including joins between foreign keys (a foreign-key-foreign-key join, an FK-FK join) are gradually increasing, but due to the problem of non-uniformity of foreign keys, a case wherein query processing performance becomes slow or query processing itself fails due to generation of overly big intermediate data in query processing occurs. Most in-memory systems process join operations by using a hash join algorithm. In this case, in a hash table probe process, comparison of all overlapping keys included in the hash table with the current join key has to be performed, and thus a large amount of operating cost is required.

For overcoming this, research of an N-ary join operation algorithm is being performed, but in performing a sort operation by using the N-ary join operation algorithm, if a sort operation necessary for N-ary join operation processing is performed only with a CPU, a limitation that operation efficiency is greatly reduced exists. Also, even if a heterogeneous query processing accelerator such as a GPU is utilized for resolving the problem of performance, in case correlation between an N-ary join processing operation and a sort operation in accordance thereto is not taken into consideration well, inefficiency in terms of performance is caused even if a CPU and a GPU are simultaneously utilized.

Prior art document—(Patent document 1) Korean Registered Patent No. 10-1862779 (2016.11.01)

DESCRIPTION OF RELATED ART

According to an embodiment of the disclosure, an effective query execution plan wherein swift query processing is possible by utilizing both of conventional binary join operators and N-ary join operators for complex join queries can be provided.

According to another embodiment of the disclosure, a query execution plan wherein an input query is expressed as a join graph, and the input query can be effectively processed through analysis of the join graph can be provided.

According to still another embodiment of the disclosure, a query optimization technology for processing a given query by comparing a query execution plan utilizing N-ary join operators and a convention query execution plan utilizing only binary join operators through analysis of a query processing cost can be provided.

According to still another embodiment of the disclosure, a query execution plan including N-ary operators for an input query can be processed at a high speed by simultaneously utilizing a CPU accelerator and a GPU accelerator.

However, the task described above is an exemplary one, and the scope of the disclosure is not limited by this.

SUMMARY

A query processing method according to an embodiment of the disclosure may acquire an input query of a database, generate a join graph consisting of vertexes corresponding to the tables of the database and edges corresponding to join information among the tables, divide the join graph into a plurality of subgraphs, generate an execution plan of a target query including N-ary join operators by using the plurality of subgraphs based on the input query, optimize the execution plan of the target query based on a cost model, and based on an available size of a GPU or CPU memory, acquire a table sort algorithm of an N-ary join operator included in the target query, determine a sort order of one or more join columns included in the tables of the N-ary join operator, and based on the sort order of the one or more join columns, perform an operation for the plurality of subgraphs.

According to an embodiment of the disclosure, the step of generating a join graph includes the step of generating the join graph by using join predicate information included in the input query, and the join graph may include table type information for the vertexes, and further include predicate information and join type information for the edges.

According to an embodiment of the disclosure, the plurality of subgraphs may include a first subgraph consisting only of edges corresponding to a foreign-key-foreign-key join type and a second subgraph including edges corresponding to a primary-key-foreign-key join type.

According to an embodiment of the disclosure, the second subgraph may consist of a plurality of edges corresponding to a primary-key-foreign-key join type, and a common vertex connected with the plurality of edges may correspond to a table of a fact table type.

According to an embodiment of the disclosure, the step of generating an execution plan of the target query may include the step of generating an execution plan of a target query including N-ary join operators based on the number of the second subgraphs.

According to an embodiment of the disclosure, the step of generating an execution plan of a target query may include the steps of, in case the number of the first subgraph is one among the plurality of subgraphs, generating sub queries by using each of the plurality of second subgraphs, and generating an execution plan of a target query wherein the sub queries are constituted as children of an N-ary join operator corresponding to the first subgraph.

According to an embodiment of the disclosure, the sub queries may be generated, in case there are a plurality of first subgraphs among the plurality of subgraphs, based on a collection of edges corresponding to a primary-key-foreign-key join type included in the first subgraphs.

According to an embodiment of the disclosure, in the step of generating an execution plan of a target query, regarding the plurality of first subgraphs, in case a sub query for the jth first subgraph including a vertex within the ith first subgraph exists, an execution plan of a target query wherein a sub query generated for the ith first subgraph and its children is constituted as a child of the sub query for the jth first subgraph may be generated.

According to an embodiment of the disclosure, in the step of generating an execution plan of a target query, in case remaining queries excluding sub queries corresponding to the plurality of subgraphs exist in the input query, an additional sub query corresponding to the remaining queries may be generated, and an execution plan of a target query wherein a sub query for the first subgraph is constituted as a child of the additional sub query may be generated.

According to an embodiment of the disclosure, in the step of optimizing the execution plan of the target query, a plurality of candidate query execution plans for the target query may be generated, the processing costs of each of the plurality of candidate query execution plans may be operated based on a designated cost model, and a query execution plan of a minimum processing cost may be acquired.

According to an embodiment of the disclosure, in the step of acquiring a sort algorithm, it is determined whether a GPU is available based on the cardinality of a table, the number of join columns, and whether a GPU apparatus is available for each child table of the N-ary join operator, and in case a GPU is available, the size of a minimum memory space required for sorting tables may be calculated by using the cardinality of the table and the sizes of the columns to be sorted of the table, and the size of the minimum memory space and an available size of a GPU may be compared, and the sort algorithm may be acquired.

According to an embodiment of the disclosure, in the step of acquiring a sort algorithm, in case the size of the minimum memory space is bigger than an available size of a GPU and there is one column to be sorted, a heterogeneous sort algorithm may be acquired.

According to an embodiment of the disclosure, in the step of acquiring a sort algorithm, in case the size of the minimum memory space is bigger than an available size of a GPU and there are a plurality of columns to be sorted, a comparison-based sort algorithm based on a CPU apparatus may be acquired.

According to an embodiment of the disclosure, in the step of acquiring a sort algorithm, in case a GPU is available, and the size of the minimum memory space is smaller than an available size of a GPU for all child tables, and there is one column to be sorted necessary for each child table, a non-comparison-based sort algorithm based on a GPU apparatus may be acquired.

According to an embodiment of the disclosure, in the step of acquiring a sort algorithm, in case a GPU is available, and the size of the minimum memory space is smaller than an available size of a GPU for all child tables, and there are a plurality of columns to be sorted, a comparison-based sort algorithm based on a GPU apparatus may be acquired.

According to an embodiment of the disclosure, in the step of acquiring a sort algorithm, in case a GPU is not available, and there is one column to be sorted necessary for each child table, a non-comparison-based sort algorithm based on a CPU apparatus may be acquired.

According to an embodiment of the disclosure, in the step of acquiring a sort algorithm, in case a GPU is not available, and there are a plurality of columns to be sorted necessary for each child table, a comparison-based sort algorithm based on a CPU apparatus may be acquired.

According to an embodiment of the disclosure, the plurality of subgraphs may include a first subgraph consisting only of edges corresponding to a foreign-key-foreign-key join type and a second subgraph including edges corresponding to a primary-key-foreign-key join type, and in the step of determining a sort order of one or more join columns, one or more global join variables may be extracted for the first subgraph, and with respect to each of the extracted one or more global join variables w, a sum $C_w$ of a set $E_w$ of edges including the global join variables as join columns in the join graph, a set $U_w$ of vertexes including the global join variables, and cardinalities of the database tables corresponding to the vertexes may be calculated, and tuples $<w, \bigvee E_w, \bigvee, C_w>$ corresponding to each of the one or more global join variables w may be acquired, and the acquired one or more tuples may be sorted based on a value, and based on the sorted tuple, a sort order among global join variables corresponding to each tuple may be determined, and a sort order of one or more join columns including each of the global join variables may be determined.

According to an embodiment of the disclosure, in the step of performing an operation for the plurality of subgraphs, a processing order among a plurality of sub queries included in one or more second subgraphs may be determined, and according to the determined processing order among the plurality of sub queries, execution of the plurality of sub queries and sorting of the execution results of the plurality of sub queries may be performed in parallel.

According to an embodiment of the disclosure, in the step of performing execution of the plurality of sub queries and sorting of the execution results of the plurality of sub queries in parallel according to the determined processing order among the plurality of sub queries, in case the size of data of the execution results of the sub queries $S_i$ is smaller than the GPU memory size, sorting of the data of the execution results of the sub queries $S_i$ and execution of the next sub query $S_{i+1}$ are performed in parallel by using a GPU, and in case the size of data of the execution results of the sub queries 5, is bigger than the GPU memory size, sorting of intermediate result data of sort units (chunks) of a heterogeneous sort algorithm and execution of the sub queries $S_i$ may be performed in parallel by using a GPU.

According to an embodiment of the disclosure, a query processing plan that may utilize N-ary join operators for complex relational database queries may be generated, and query processing performance can thereby be improved.

BRIEF DESCRIPTION OF THE DRAWINGS

FIG. 15 is a table for illustrating the meanings of the symbols illustrated in FIG. 16 and FIG. 17;

DETAILED DESCRIPTION

Figure 1:
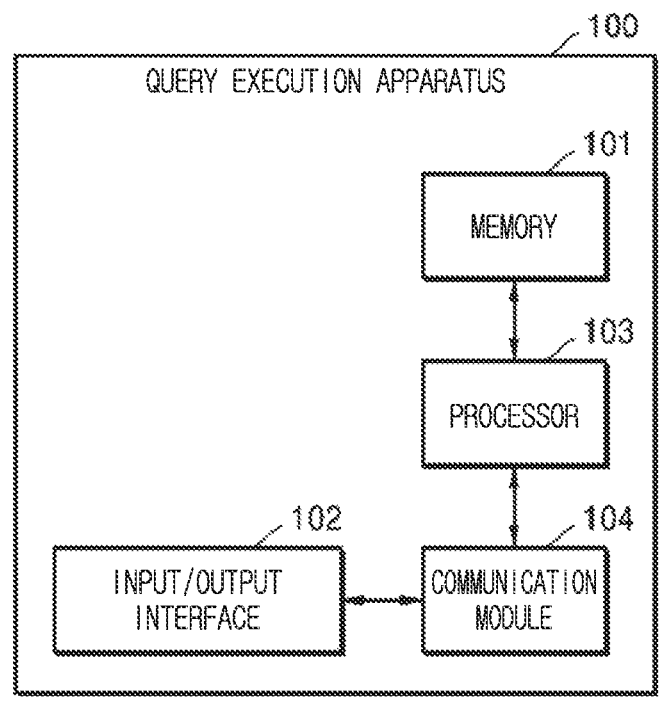
FIG. 1 is a diagram for illustrating a configuration of a query execution apparatus according to an embodiment of the disclosure.

Hereinafter, various embodiments of the disclosure will be described in association with the accompanying drawings. Various modifications may be made to the embodiments of the disclosure and there may be various embodiments, and specific embodiments are illustrated in drawings and detailed description related thereto are described. However, the specific embodiments are not intended to limit the various embodiments of the disclosure to specific embodiments, but should be interpreted to include all modifications and/or equivalents or alternatives included in the idea and technical scope of the various embodiments of the disclosure. Also, with respect to the description of drawings, similar reference numerals were used for similar components.

Expressions such as "include" or "may include" that can be used in the various embodiments of the disclosure indicate existence of corresponding functions, operations, or components disclosed, and do not restrict one or more additional functions, operations, or components. Also, in the various embodiments of the disclosure, terms such as "include" and "have" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Also, in the various embodiments of the disclosure, the expression "or" includes any, and all possible combinations of words listed together with the expression. For example, the expression "A or B" may include A, or may include B, or may include both of A and B.

The expressions such as "first," "second," and the like used in the various embodiments of the disclosure may modificate various components of various embodiments, but the expressions do not limit the components. For example, the expressions do not limit the order and/or degree of importance of the components. Meanwhile, the expressions may be used to distinguish a component from another component. For example, both of a first user apparatus and a second user apparatus are user apparatuses, and they refer to user apparatuses different from each other. For example, a first component may be called a second component, and a second component may be called a first component in a similar manner, without departing from the scope of the various embodiments of the disclosure.

Meanwhile, the description in this specification that one component is "connected to" or "accesses" another component should be interpreted to mean that one component may be directly connected to or directly access another component, but another new element may exist between the one component and the another component. In contrast, the description in this specification that one component is "directly connected to" or "directly accesses" another component should be interpreted to mean that another new element does not exist between the one component and the another component.

Terms used in the various embodiments of the disclosure are used just to explain specific embodiments, and are not intended to limit the various embodiments of the disclosure. Also, singular expressions include plural expressions, unless they mean obviously differently in the context.

All terms used herein, including technical or scientific terms, have meanings identical to those generally understood by those having ordinary skill in the technical field to which the various embodiments of the disclosure belong, unless defined differently.

Also, terms defined in dictionaries generally used may be interpreted to have the same meaning as the contextual meaning in the related art. In addition, unless defined obviously in the various embodiments of the disclosure, the terms used herein are not interpreted to have an ideal or overly formal meaning.

FIG. 1 is a diagram for illustrating an internal configuration of a query execution apparatus (or query processing apparatus) according to an embodiment of the disclosure.

The database query execution apparatus 100 according to an embodiment of the disclosure may make tables of a database correspond to vertexes and make join information among the tables correspond to edges by using join predicate information among the database tables. Afterwards, the query execution apparatus 100 may generate a join graph consisting of the aforementioned vertexes and edges, and the join graph may further include type information of the database tables and detailed information for join predicates.

Then, the query execution apparatus 100 according to an embodiment of the disclosure may decompose the join graph by utilizing detailed information of the tables included in the join graph and detailed information of a join operation among the tables. Also, the query execution apparatus 100 may rewrite an input query and generate an execution plan of a target query making a query execution plan including N-ary join operators. Here, the query execution apparatus 100 may generate all possible candidate query execution plans for the target query, and perform query optimization for each candidate query execution plan, and select a query execution plan of a minimum cost.

In case N-ary join operators are included in the selected query execution plan, the query execution apparatus 100 may select a sort algorithm with the input tables of each N-ary join operator as subjects. Also, the query execution apparatus 100 may process the query execution plan by determining a sort order among join columns of tables used as inputs of each N-ary join operator. More detailed explanation for the aforementioned query execution apparatus will be made later in the related drawings.

According to an embodiment of the disclosure, the query execution apparatus 100 may include an input/output interface 102, a memory 101, a processor 130, and a communication module 104. The memory 101 is a recording medium that is readable in a computer, and it may include permanent mass storage devices such as a random access memory (RAM), a read only memory (ROM), and a disk drive. Also, in the memory 101, program codes and settings for controlling the query execution apparatus 100, database table information, join graph information, and query execution plans may be stored temporarily or permanently.

The processor 103 may be configured to process instructions of computer programs by performing basic arithmetic, logic, and input/output operations. Instructions may be provided to the processor 103 by the memory 101 or the communication module 104. For example, the processor 103 may be configured to execute instructions received according to program codes stored in a recording apparatus such as the memory 101.

The communication module 104 may provide a function for communicating with an external apparatus through a network. As an example, a request that the processor 103 of the query execution apparatus 100 generated according to a program code stored in a recording apparatus such as the memory 101 may be transmitted to an external apparatus through a network according to control by the communication module 104. Inversely, control signals or instructions, contents, files, etc. provided according to control by a processor of an external apparatus may be received at the query execution apparatus 100 through the communication module 104 via a network. For example, a control signal or an instruction, etc. of an external apparatus received through the communication module 104 may be transmitted to the processor 103 or the memory 101, and contents or files may be stored in a storage medium that the query execution apparatus 100 may further include.

Also, the communication module 104 may communicate with an external apparatus through a network. Communication methods are not limited, but a network may be a near field wireless communication network. For example, a network may be Bluetooth, Bluetooth Low Energy (BLE), and Wifi communication networks.

In addition, the input/output interface 102 may receive an input of a user, and display output data. Further, the input/output interface 102 according to an embodiment of the disclosure may receive input of input query information, and output an execution plan of a target query that was rewritten.

Further, in the other embodiments of the disclosure, the query execution apparatus 100 may include more components than the components in FIG. 1. However, there is no need to clearly illustrate components of conventional technologies. For example, the query execution apparatus 100 may include a battery and a charging apparatus supplying power to the internal components of the query execution apparatus, and may be implemented to include at least some of the aforementioned input/output apparatuses, or further include other components such as a transceiver, a global positioning system (GPS) module, various types of sensors, or a database, etc.

Figure 2:
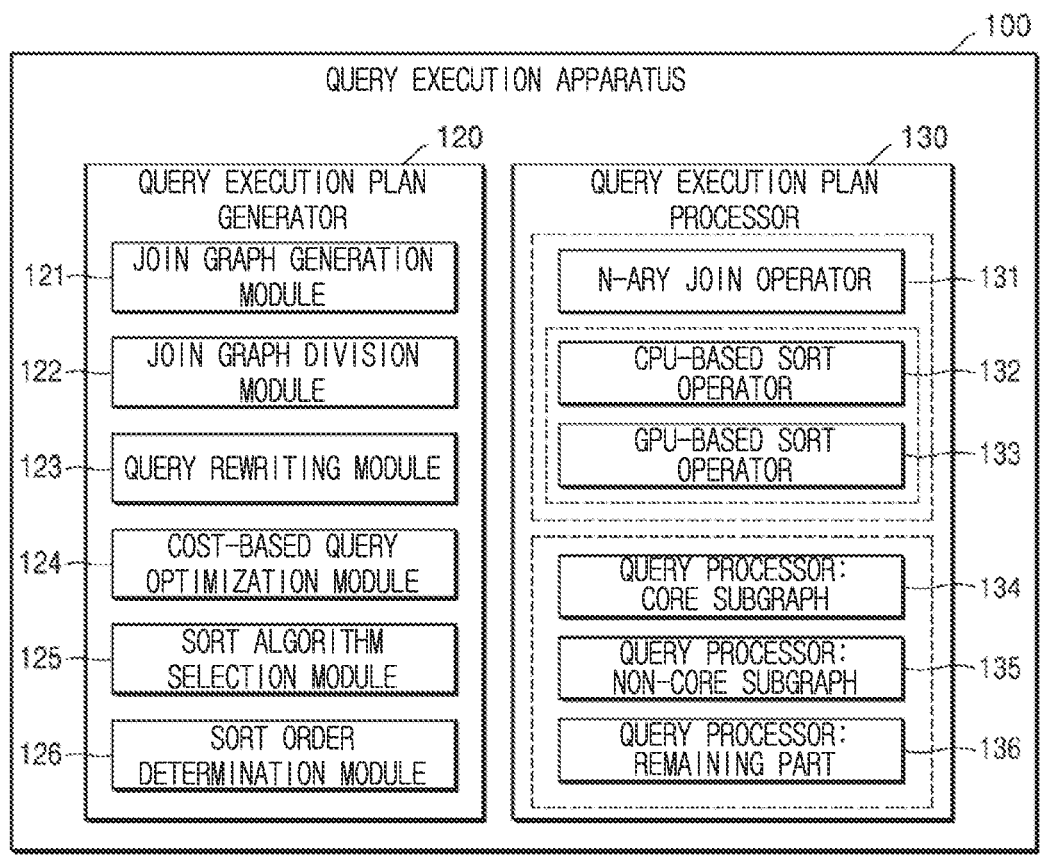
FIG. 2 is a block diagram for illustrating an operation of a query execution apparatus according to an embodiment of the disclosure.

FIG. 2 is a block diagram for illustrating an operation of a query execution apparatus according to an embodiment of the disclosure.

The query execution apparatus 100 according to an embodiment of the disclosure may include a query execution plan generator 120 and a query execution plan processor 130.

According to an embodiment of the disclosure, the query execution plan generator 120 may include a join graph generation module 121, a join graph division module 122, a query rewriting module 123, a cost-based query optimization module 124, a sort algorithm selection module 125, and a sort order determination module 126.

According to an embodiment of the disclosure, the join graph generation module 121 may generate a join graph consisting of vertexes corresponding to tables of the database and edges corresponding to join information among the tables. More detailed explanation in this regard will be made later with reference to FIG. 4 to FIG. 7.

According to an embodiment of the disclosure, the join graph division module 122 may divide a join graph into a plurality of subgraphs. More detailed explanation in this regard will be made later with reference to FIG. 5.

According to an embodiment of the disclosure, the query rewriting module 123 may generate an execution plan of a target query including N-ary join operators by using the plurality of subgraphs based on an input query. More detailed explanation in this regard will be made later with reference to FIG. 6 to FIG. 9.

According to an embodiment of the disclosure, the cost-based query optimization module 124 may optimize the execution plan of the target query based on a designated cost model. More detailed explanation in this regard will be made later with reference to FIG. 10, FIG. 16, and FIG. 17.

According to an embodiment of the disclosure, the sort algorithm selection module 125 may acquire a table sort algorithm of N-ary join operators included in the target query based on the available size of a GPU or CPU memory. More detailed explanation in this regard will be made later with reference to FIG. 14.

According to an embodiment of the disclosure, the sort order determination module may determine a sort order of one or more join columns included in the tables of N-ary join operators. More detailed explanation in this regard will be made later with reference to FIG. 12.

The query execution plan processor 130 according to an embodiment of the disclosure may include a physical relational operator (not shown) that is generally included in the pertinent technical field, and may further include an N-ary join operator 131, a CPU-based sort operator 132, and a GPU-based sort operator 133 in some embodiments of the disclosure. Also, the query execution plan processor according to an embodiment of the disclosure may include a query processor 134 of a core subgraph, a query processor 135 of non-core subgraphs, and a query processor 136 of the remaining part. According to an embodiment of the disclosure, the query processor 136 of the remaining part may process the remaining part excluding a query execution plan for processing a core subgraph and non-core subgraphs among query execution plans. Detailed explanation regarding the operations of the N-ary join operator 131, the CPU-based sort operator 132, and the GPU-based sort operator 133 will be made later with reference to FIG. 11, and detailed explanation regarding the operations of the query processors 134, 135, 136 will be made later with reference to FIG. 6.

Figure 3:
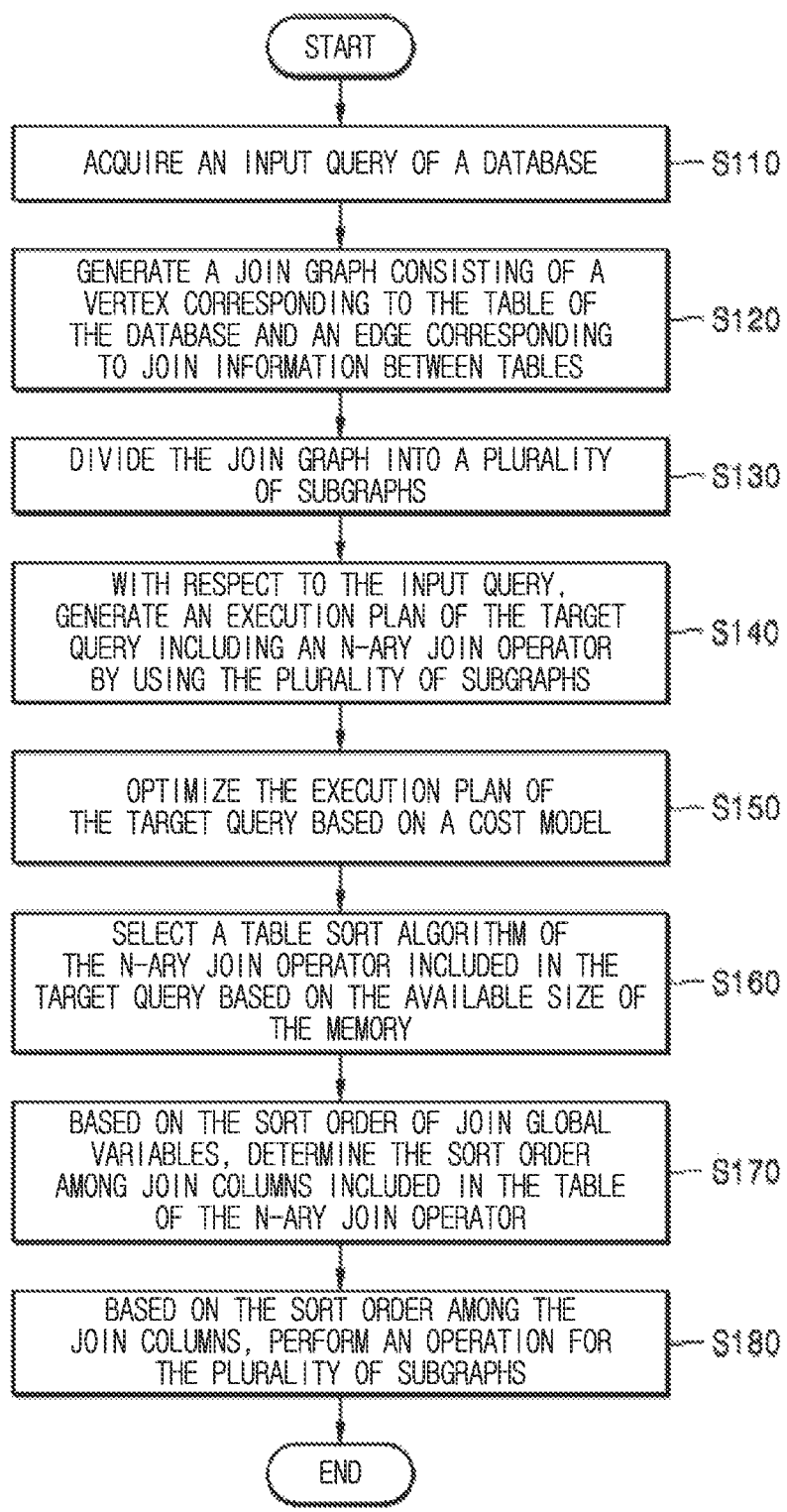
FIG. 3 is a flow chart of a query execution method according to an embodiment of the disclosure.

FIG. 3 is a flow chart of a query execution (or processing) method according to an embodiment of the disclosure.

At operation S110, a query execution apparatus according to an embodiment of the disclosure may acquire an input query of a database.

At operation S120, a query execution apparatus according to an embodiment of the disclosure may generate a join graph consisting of vertexes corresponding to the tables of the database and edges corresponding to join information among the tables. According to an embodiment of the disclosure, the query execution apparatus may generate the join graph by using join predicate information included in the input query, and the join graph may include table type information for the vertexes, and may further include predicate information and join type information for the edges.

At operation S130, the query execution apparatus according to an embodiment of the disclosure may divide the join graph into a plurality of subgraphs. According to an embodiment of the disclosure, the aforementioned plurality of subgraphs may include a first subgraph consisting only of edges corresponding to a foreign-key-foreign-key join (FK-FK join) type and a second subgraph including edges corresponding to a primary-key-foreign-key join (PK-FK join) type. Hereinafter, explanation will be made based on the assumption that the first sub graph may be a core subgraph, and the second subgraph may be a non-core subgraph.

According to an embodiment of the disclosure, the second subgraph may consist of a plurality of edges corresponding to a primary-key-foreign-key join type, and a common vertex connected with the plurality of edges may correspond to a table of a fact table type.

At operation S140, the query execution apparatus according to an embodiment of the disclosure may generate an execution plan of a target query including N-ary join operators by using the plurality of subgraphs for the input query. Also, the query execution apparatus according to an embodiment of the disclosure may generate an execution plan of a target query including N-ary join operators based on the number of the second subgraphs.

A target query execution apparatus according to another embodiment of the disclosure may, in case there is one first subgraph among the plurality of subgraphs, generate sub queries by using each of the plurality of second subgraphs. Also, the target query execution apparatus may generate an execution plan of a target query wherein sub queries are constituted as children of an N-ary join operator corresponding to the first subgraph. According to an embodiment of the disclosure, the query execution apparatus may, in case there are a plurality of first subgraphs among the plurality of subgraphs, generate sub queries based on a set of edges corresponding to a primary-key-foreign-key join type included in the first subgraphs.

For example, the query execution apparatus according to an embodiment of the disclosure may generate, regarding the plurality of first subgraphs, in case a sub query for the jth first subgraph including a vertex within the ith first subgraph exists, an execution plan of a target query wherein a sub query generated for the ith first subgraph and its children is constituted as a child of the sub query for the jth first subgraph.

A query execution apparatus according to still another embodiment of the disclosure may, in case remaining queries excluding sub queries corresponding to the plurality of subgraphs exist in the input query, generate an additional sub query corresponding to the remaining queries, and generate an execution plan of a target query wherein a sub query for the first subgraph is constituted as a child of the additional sub query.

At operation S150, the query execution apparatus according to an embodiment of the disclosure may optimize a query execution plan of a target query based on a cost model. According to an embodiment of the disclosure, the query execution apparatus may generate a plurality of candidate query execution plans for a target query, operate the processing costs of each of the plurality of candidate query execution plans based on a designated cost model, and acquire a candidate query execution plan of a minimum processing cost.

At operation S160, the query execution apparatus according to an embodiment of the disclosure may select a table sort algorithm of N-ary join operators included in the target query based on the available size of a memory. According to an embodiment of the disclosure, the query execution apparatus may determine whether a GPU is available based on the cardinality of a table, the number of join columns, and whether a GPU apparatus is available for each child table of the N-ary join operator. Afterwards, in case a GPU is available, the query execution apparatus may calculate the size of a minimum memory space required for sorting tables by using the cardinality of the table and the sizes of the columns to be sorted of the table. Also, the query execution apparatus may compare the size of the minimum memory space and an available size of a GPU, and acquire the sort algorithm.

According to an embodiment of the disclosure, in case the size of the minimum memory space is bigger than the available size of a GPU and there is one column to be sorted, the query execution apparatus may acquire a heterogeneous sort algorithm. Alternatively, in case the size of the minimum memory space is bigger than the available size of a GPU and there are a plurality of columns to be sorted, a comparison-based sort algorithm based on a CPU apparatus may be acquired. Alternatively, in case a GPU is available and the size of the minimum memory space is smaller than the available size of a GPU for all child tables, and there is one column to be sorted for each child table, a non-comparison-based sort algorithm based on a GPU apparatus may be acquired. Alternatively, in case a GPU is available and the size of the minimum memory space is smaller than the available size of a GPU for all child tables, and there are a plurality of columns to be sorted, a comparison-based sort algorithm based on a GPU apparatus may be acquired. Alternatively, in case a GPU is not available and there is one column to be sorted for each child table, a non-comparison-based sort algorithm based on a CPU apparatus may be acquired. Alternatively, in case a GPU is not available and there are a plurality of columns to be sorted for each child table, a comparison-based sort algorithm based on a CPU apparatus may be acquired.

At operation S170, the query execution apparatus according to an embodiment of the disclosure may determine a sort order among join columns included in tables of an N-ary join operator, based on the sort order of global join variables. According to an embodiment of the disclosure, the query execution apparatus may extract one or more global join variables for the first sub graph, and with respect to each of the extracted one or more global join variables w, the query execution apparatus may calculate the sum $C_w$ of a set $E_w$ of edges including the global join variables as join columns in the join graph, a set $U_w$ of vertexes including the global join variables, and the cardinalities of the database tables corresponding to the vertexes. Also, the query execution apparatus may acquire tuples w,√Ew √,Cw> corresponding to each of the one or more global join variables w, and sort the acquired one or more tuples based on a value, and based on the sorted tuples, determine a sort order among global join variables corresponding to each tuple, and determine a sort order of one or more join columns including the respective global join variables.

At operation S180, the query execution apparatus according to an embodiment of the disclosure may perform an operation for the plurality of subgraphs, based on the sort order among join columns. According to an embodiment of the disclosure, the query execution apparatus may determine a processing order among a plurality of sub queries included in one or more second subgraphs, and perform execution of the plurality of sub queries and sorting of the execution results of the plurality of sub queries in parallel according to the determined processing order among the plurality of sub queries.

Also, according to an embodiment of the disclosure, the query execution apparatus may, in case the size of data of the execution results of the sub queries $S_i$ is smaller than the GPU memory size, perform sorting of the data of the execution results of the sub queries $S_i$ and execution of the next sub query $S_{i+1}$; in parallel by using a GPU, and in case the size of data of the execution results of the sub queries $S_i$ is bigger than the GPU memory size, perform sorting of intermediate result data of sort units (chunks) of a heterogeneous sort algorithm and execution of the sub queries $S_i$ in parallel by using a GPU.

Figure 4:
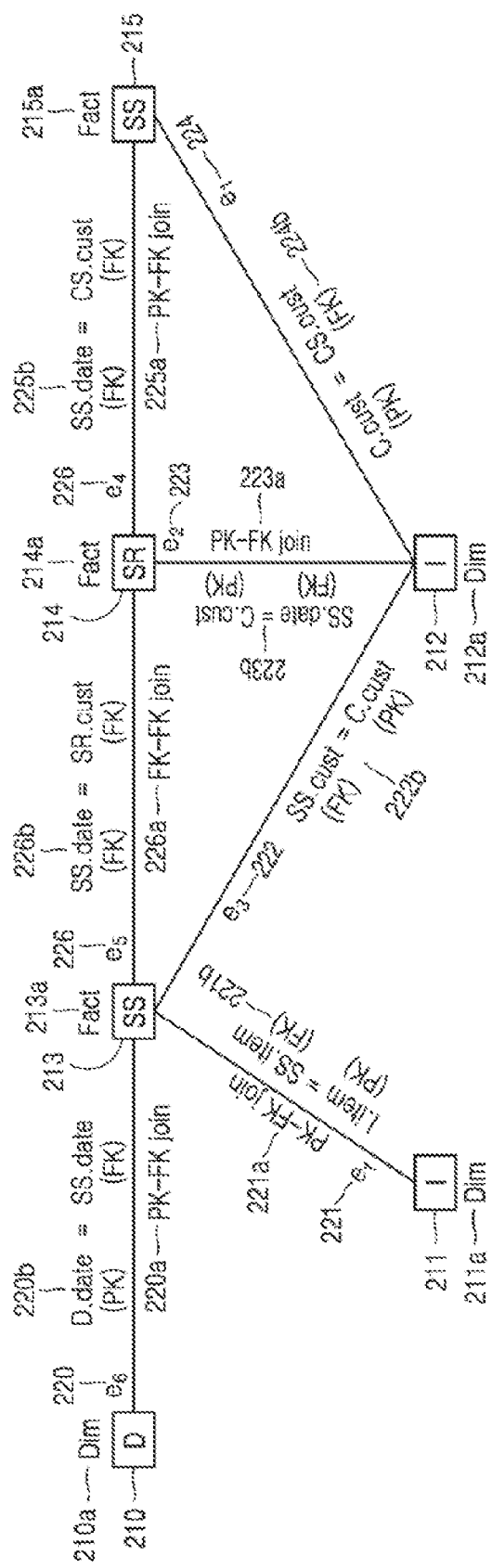
FIG. 4 is an exemplary diagram of a join graph according to an embodiment of the disclosure.

FIG. 4 is an exemplary diagram of a join graph according to an embodiment of the disclosure.

A join graph according to an embodiment of the disclosure may include one or more vertexes 210, 211, 212, 213, 214, 215 corresponding to database tables that participated in a query expressed with six vertexes in total. Also, the join graph may include one or more edges 220, 221, 222, 223, 224, 225, 226 corresponding to a join operation among the database tables. The one or more vertexes may include the type information 210a, 211a, 212a, 213a, 214a, 215a of the tables corresponding to each vertex, and the one or more edges may include type information 220a, 221a, 222a, 223a, 224a, 225a, 226a of a join operation and join predicate information 220b, 221b, 222b, 223b, 224b, 225b, 226b corresponding to each edge.

According to an embodiment of the disclosure, the query execution apparatus may constitute database tables (hereinafter, referred to as tables) included in a join operation of an input query as nodes of a join graph by using the join graph analysis module 121 and the join graph generation module 122 in FIG. 2. Also, the vertexes may further include label information, and the label information may include the type information of the corresponding tables, and the type of the tables may be a fact table (fact) type, or a dimension table (Dim) type.

According to an embodiment of the disclosure, the query execution apparatus may constitute a join relation between two tables included in a join operation of an input query as edges of a join graph. In this embodiment, edges may include label information, and the label information may include join predicate information and join type information. In this case, the join type information included in label information of each edge may be one of a PK-FK join or an FK-FK join. According to an embodiment of the disclosure, a PK-FK join may correspond to a join operation between a Dim table and a Fact table, and an FK-FK join may correspond to a join operation between two fact tables.

Figure 5:
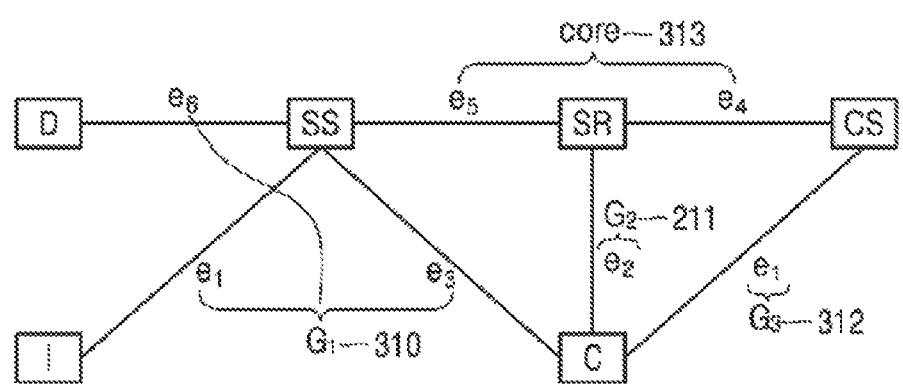
FIG. 5 is a diagram for illustrating a method of dividing a join graph having one core subgraph according to an embodiment of the disclosure.

FIG. 5 is a diagram for illustrating a method of dividing a join graph wherein there is one core subgraph according to an embodiment of the disclosure.

The subgraph illustrated in FIG. 5 is an example of a subgraph which was generated as the join graph illustrated in FIG. 4 was divided. According to an embodiment of the disclosure, the join graph division module 122 may divide a join graph and acquire subgraphs. Also, according to an embodiment of the disclosure, subgraphs may be constituted as a set of connected components included in a join graph, and in this case, each of the connected components may correspond to the edges of the subgraphs. Here, it should be noted that an edge commonly included does not exist between any two subgraphs.

For example, the join graph in FIG. 4 may be divided into a plurality of subgraphs. Subgraphs generated by division of a join graph may be core subgraphs or non-core subgraphs. Core subgraphs are core={$e_4$, $e_5$} illustrated in FIG. 5, and in this case, the core sub graphs may include only edges wherein the type of each edge is an FK-FK join. Accordingly, non-core subgraphs may be {$G_1$, $G_2$, $G_3$} illustrated in FIG. 5.

Figure 6:
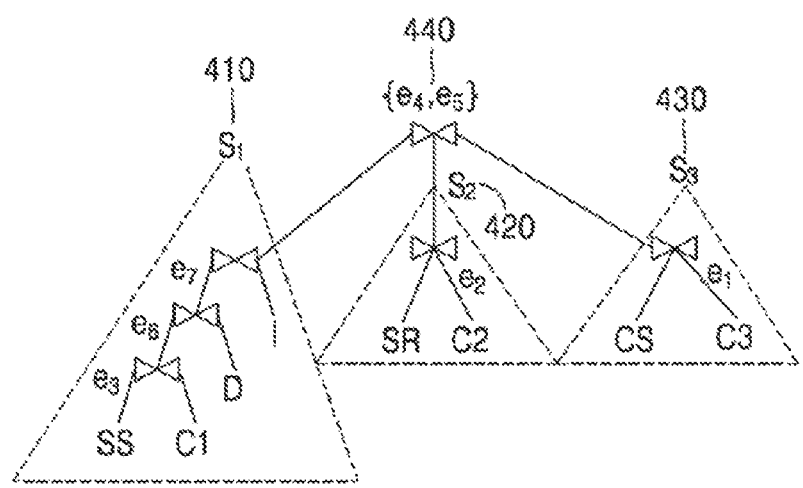
FIG. 6 is a diagram for illustrating a method of generating an execution plan of queries by utilizing decomposition of join graphs according to an embodiment of the disclosure.

FIG. 6 is a diagram for illustrating a method of generating a query execution plan by using join graph decomposition according to an embodiment of the disclosure.

Hereinafter, explanation will be made based on the assumption that FIG. 6 is a query execution plan generated as a result of join graph decomposition in FIG. 5. The non-core subgraphs {$G_1$, $G_2$, $G_3$} in FIG. 5 may respectively correspond to {$S_1$, $S_2$, $S_3$} in FIG. 6. According to an embodiment of the disclosure, core subgraphs are subgraphs including only FK-FK joins, and they may be processed as an N-ary join operators 440 in a query execution plan. In this case, the N-ary join operator 440 {$e_4$, $e_5$} may have three non-core subgraphs $S_1$ (410), $S_2$ (420), and $S_3$ (430) as children. According to an embodiment of the disclosure, in case the number of children of the N-ary join operator 440 is two, the N-ary join operator 440 may be a binary join operator. Through this, even if a hash join is not used, a N-ary join processing algorithm may be used as it is and a query wherein the number of inputs is two may be generated.

The non-core subgraphs {$S_1$, $S_2$, $S_3$} illustrated in FIG. 6 may include one or more PK-FK joins. Here, the non-core subgraphs may be operated based on an operation method of a system that those having ordinary skill in the pertinent field can select, instead of N-ary join operators. In this case, the query execution plan processor 130 of the query execution apparatus 100 according to an embodiment of the disclosure may perform an operation for non-core subgraphs through a query execution plan using only binary join operators.

Figure 7:
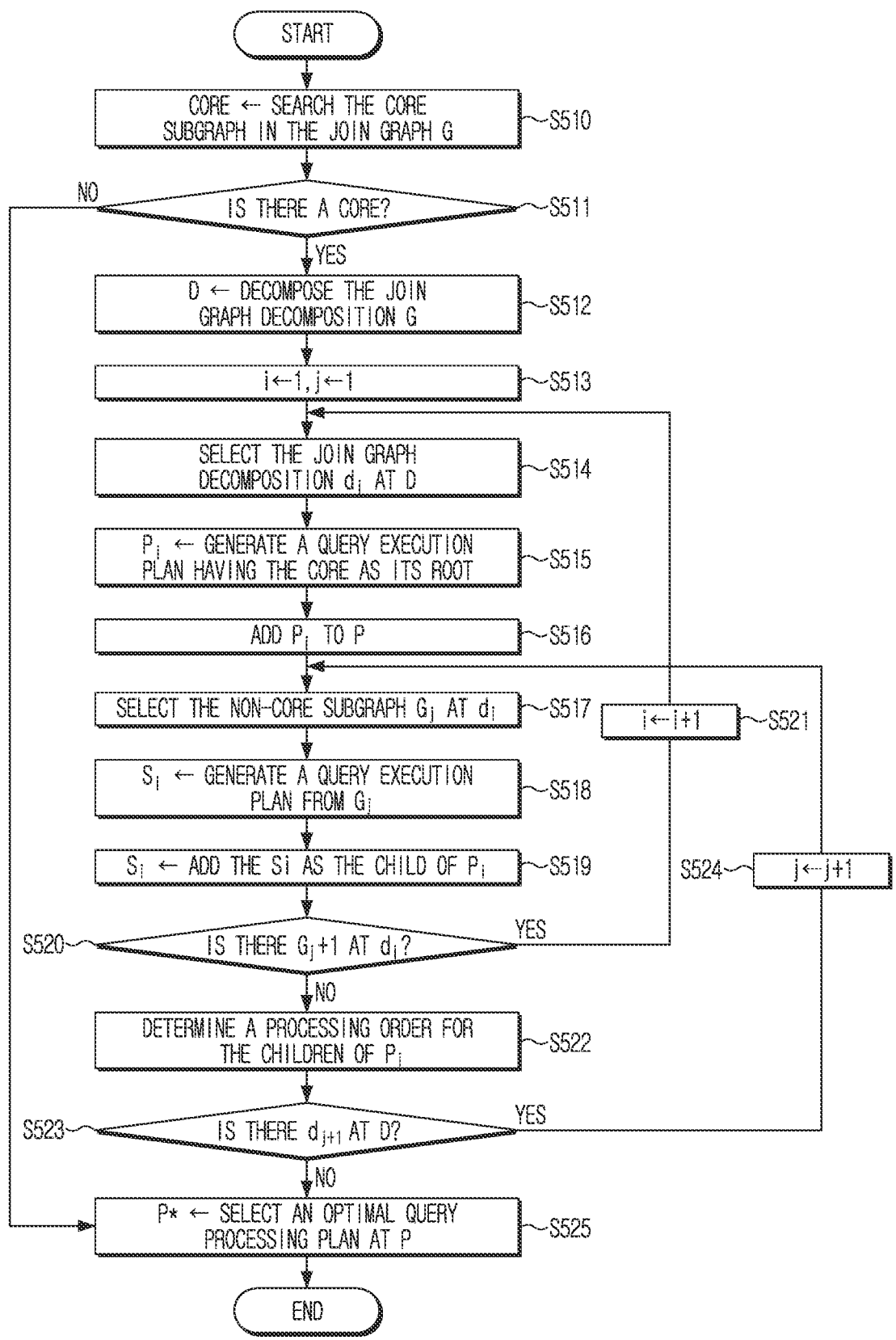
FIG. 7 is a flow chart of a method of generating an execution plan of queries including N-ary join operators in case there is one core subgraph according to an embodiment of the disclosure.

FIG. 7 is a flow chart of a method of generating an execution plan of a query including N-ary join operators in case there is one core subgraph according to an embodiment of the disclosure.

Hereinafter, a method for the query execution plan generator 120 to generate a query execution plan including one N-ary join operator in case there is one core subgraph acquired by dividing a join graph will be described in detail with reference to FIG. 7. For clear explanation of the disclosure, explanation will be made based on the example of the method of generating a query execution plan including the N-ary join operator 440 and the sub queries 410, 420, 430 corresponding to non-core subgraphs illustrated in FIG. 6. Meanwhile, it is obvious that the query execution plan generated according to an embodiment of the disclosure can be implemented as an actual query execution plan through the query rewriting module 123.

At operation S510, the query execution plan according to an embodiment of the disclosure analyzes a join graph G for an input query made by utilizing the join graph generation module 121 in FIG. 2 and identifies whether a core subgraph exists in the join graph.

At operation S511, the query execution apparatus according to an embodiment of the disclosure may identify whether there is a core subgraph (core) included in the join graph G.

In case a core subgraph is not included in the join graph, at operation S525, the query execution apparatus 100 according to an embodiment of the disclosure may select the existing query execution plan as the final query execution plan P of the input query.

In case a core subgraph exists, at operation S512, the join graph decomposition module 122 of the query execution apparatus 100 according to an embodiment of the disclosure may separately store all possible decomposition results D for the join graph G.

At operation S513, the query execution apparatus according to an embodiment of the disclosure may initialize each of the variables i and j used in a loop as 0. In this case, it is assumed that i is the variable of the decomposition result D, and j is the variable of the jth non-core subgraph included $G_j$ in the ith join graph decomposition result $d_i$.

Hereinafter, through the operation S514 to the operation S520, a method of generating a query execution plan based on the join graph decomposition result $d_i$ will be described. The query execution apparatus according to an embodiment of the disclosure may perform the operation S514 to the operation S520, and thereby generate a query execution plan $P_i$ including N-ary join operators for each join graph $d_i$.

At operation S515, the query execution apparatus according to an embodiment of the disclosure may generate a query execution plan $P_i$ having one core subgraph included in the join graph decomposition result $d_i$ as the root. That is, the generated query execution plan may be generated in the form of a tree having an N-ary join operator corresponding to the core subgraph as the root.

At operation S516, the query execution apparatus may include the generated query execution plan $P_i$ in the candidate query execution plans P.

Afterwards, the query execution apparatus according to an embodiment of the disclosure may add the non-core subgraph $G_j$ to the query execution plan $P_i$, included in the join graph decomposition result $d_i$ at the operation S517 to the operation S523. In this case, the query execution apparatus may generate the query execution plan $P_i$ such that the non-core subgraph $G_j$ becomes a child of an N-ary join operator corresponding to the core subgraph. Also, the query execution apparatus may determine a processing order among the children of the core subgraph included in the query execution plan $P_i$.

To be more specific, at operation S517, the query execution apparatus according to an embodiment of the disclosure may select the non-core subgraph $G_j$ included in the join graph decomposition $d_i$.

At operation S518, the query execution apparatus may generate a query execution plan of sub queries for processing PK-FK joins included in the non-core subgraph $G_j$.

Afterwards, at operation S519, the query execution apparatus may add the generated query execution plan of the non-core subgraph $G_j$ as a child of an N-ary join operation for the core subgraph.

At operation S520, the query execution apparatus may identify whether the next non-core subgraph $G_{j+1}$ of the aforementioned non-core subgraph $G_j$ is included in the join graph decomposition result $d_i$.

In case the non-core subgraph $G_{j+1}$ exists, the query execution apparatus increases the decomposition result variable i of the join graph at operation S521. In case the non-core subgraph $G_{j+1}$ does not exist, the query execution apparatus may determine a sort order among the children of the N-ary join operator in the query execution plan $P_i$ at operation S522.

At operation S523, the query execution apparatus identifies whether join graph decompositions for making a query execution plan additionally exist inside D.

According to an embodiment of the disclosure, in case a join graph for making the aforementioned query execution plan does not exist, the query execution apparatus may increase the value of the variable j as in the operation S524. Also, according to an embodiment of the disclosure, in case a join graph for making the aforementioned query execution plan does not exist, the query execution apparatus selects the final query execution plan P in the query execution plans P for all join graph decompositions for the join graph G.

Figure 8:
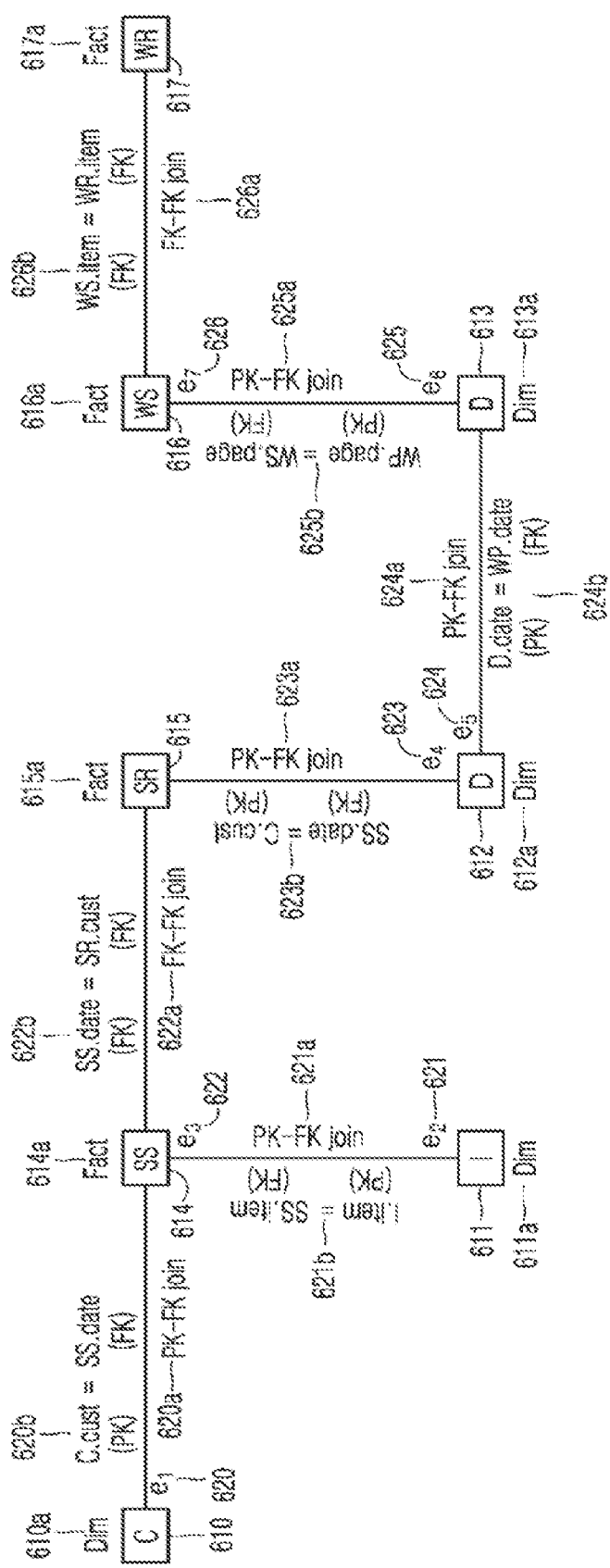
FIG. 8 is an exemplary diagram of a join graph including one or more core subgraphs according to an embodiment of the disclosure.

FIG. 8 is an exemplary diagram of a join graph including one or more core subgraphs according to an embodiment of the disclosure. Hereinafter, explanation will be made by using the join graph illustrated in FIG. 8.

A join graph according to an embodiment of the disclosure may include one or more vertexes 610, 611, 612, 613, 614, 615, 616 corresponding to database tables that participated in a query, and may include one or more edges 620, 621, 622, 623, 624, 625, 626 corresponding to a join operation among the database tables. According to an embodiment of the disclosure, the one or more vertexes may include type information 610a, 611a, 612a, 613a, 614a, 615a of tables corresponding to each vertex, and the one or more edges may include type information 620a, 621a, 622a, 623a, 624a, 625a, 626a of a join operation and join predicate information 620b, 621b, 622b, 623b, 624b, 625b, 626b corresponding to each edge.

Hereinafter, a method of acquiring core subgraphs according to an embodiment of the disclosure will be described. The query execution apparatus according to an embodiment of the disclosure may divide subgraphs based on whether edges are connected. For example, the join graph illustrated in FIG. 8 includes two core subgraphs corresponding to the edge $e_1$ (622) and the edge $e_2$ (626). In this case, as the edge $e_1$ (622) and the edge $e_2$ (626) are not directly connected, core subgraphs corresponding to each of the edges may be generated independently.

Figure 9:
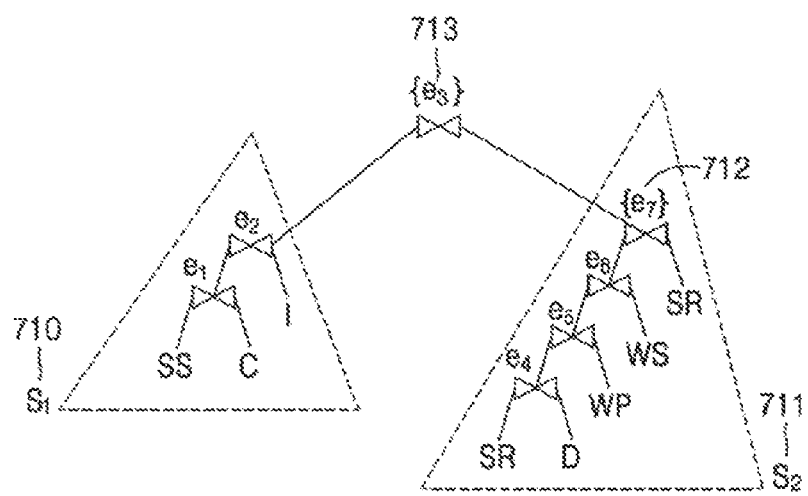
FIG. 9 is a diagram for illustrating a method of dividing a join graph including one or more core subgraphs according to an embodiment of the disclosure.

FIG. 9 is a diagram for illustrating a method of dividing a join graph including one or more core subgraphs according to an embodiment of the disclosure.

FIG. 9 is an example of various types of query execution plans that can be generated for a join graph corresponding to FIG. 8. According to an embodiment of the disclosure, the query execution plan illustrated in FIG. 9 may include binary join operators 712, 713 processing two FK-FK joins. Specifically, the join operator 713 may have the subgraph $S_1$ (710) and the subgraph $S_2$ (711) as children.

Here, the subgraph $S_2$ (711) may include an edge $e_7$ (712) corresponding to an FK-FK join. In this case, the query execution apparatus according to an embodiment of the disclosure may perform the operation S810 to the operation S816 in FIG. 10 after the operation S525 in FIG. 7. That is, in this embodiment, the query execution apparatus may perform the operation S510 to the operation S525 in FIG. 7 for the initial core subgraph.

Also, in case all of the children of the aforementioned initial core subgraph are non-core subgraphs, and the non-core subgraphs include edges corresponding to FK-FK joins, the query execution apparatus according to an embodiment of the disclosure may perform the operation S810 to the operation S815 in FIG. 10 that will be described below before selecting a final query execution plan, and thereby make a new sub query. In this embodiment, the query execution apparatus may generate a query execution plan of a sub query having an additionally found core subgraph as the root. For example, the edge $e_7$ (712) of the subgraph $S_2$ (711) illustrated in FIG. 9 may be the root of the query execution plan of the sub query.

Figure 10:
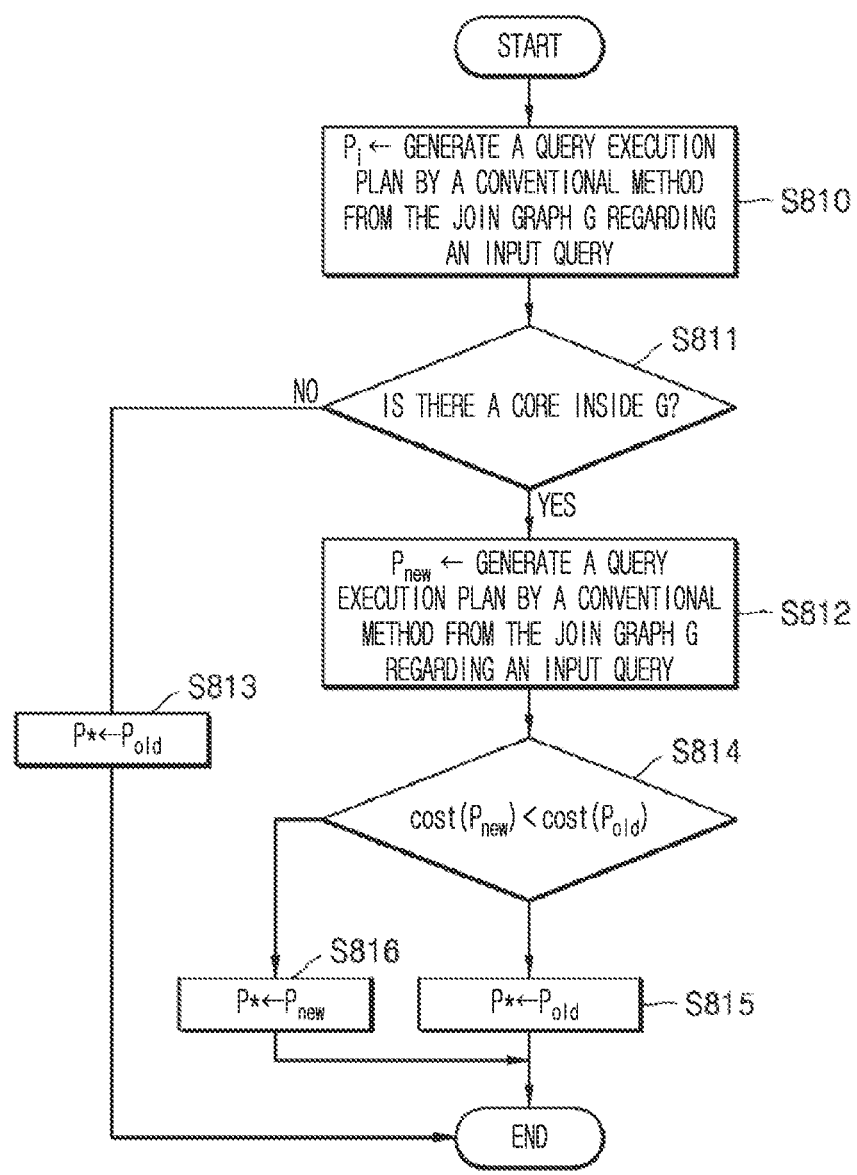
FIG. 10 is a diagram for illustrating a method of optimizing an execution plan of a target query based on a cost model according to an embodiment of the disclosure.

FIG. 10 is a diagram for illustrating a method of optimizing a query execution plan of a target query based on a cost model according to an embodiment of the disclosure.

At operation S810, the query execution apparatus according to an embodiment of the disclosure may generate a query execution plan $P_{old}$ using only binary join operators from a join graph G for an input query.

Afterwards, at operation S811, the query execution apparatus may identify whether a core subgraph exists in the join graph G.

According to an embodiment of the disclosure, in case the aforementioned core subgraph does not exist in the join graph, the query execution apparatus according to an embodiment of the disclosure may select $P_{old}$ as the final query execution plan P at operation S813.

According to another embodiment of the disclosure, in case a core subgraph exists in the join graph, the query execution apparatus according to an embodiment of the disclosure may generate a new query execution plan $P_{new}$ utilizing N-ary join operators through the operation S510 to the operation S525 described in FIG. 7 at operation S812.

Afterwards, at operation S814, the query execution apparatus may acquire a result of calculating processing costs based on a cost for the two query execution plans $P_{old}$ and $P_{new}$.

According to an embodiment of the disclosure, in case the processing cost of $P_{old}$ is smaller than the processing cost of $P_{new}$, the query execution apparatus may select $P_{old}$ as the final query execution plan P at operation S815.

According to another embodiment of the disclosure, the query execution apparatus may select $P_{new}$ as the final query execution plan P according to the operation S816.

Figure 11:
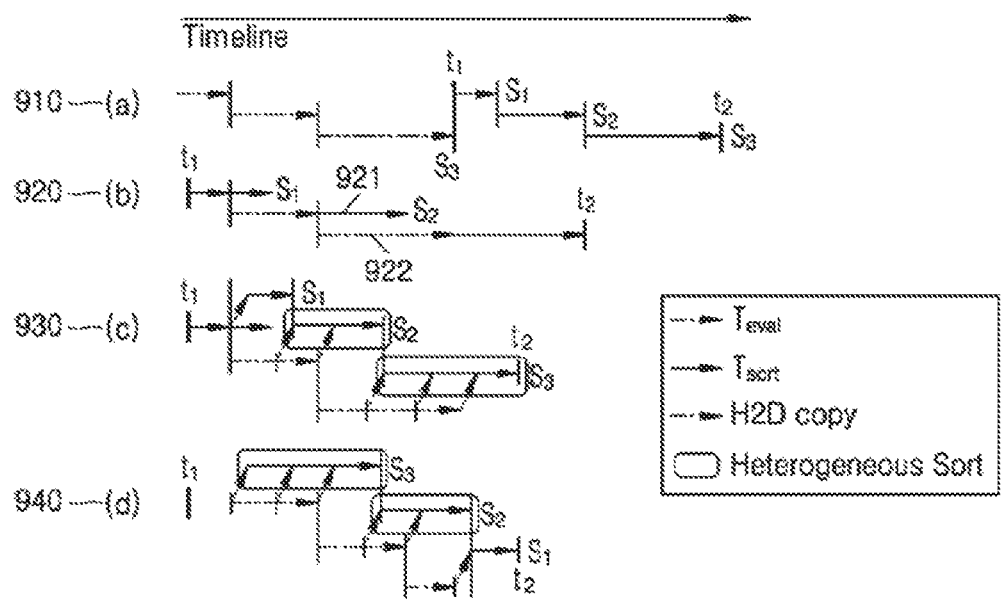
FIG. 11 is a diagram for illustrating a method of processing a core subgraph having non-core subgraphs as children according to an embodiment of the disclosure.

FIG. 11 is a diagram for illustrating a method of processing a core subgraph having non-core subgraphs as children according to an embodiment of the disclosure.

FIG. 11 is a diagram illustrating an example of evaluation performance time according to an evaluation processing order when evaluating the children $\{S_1,S_2,S_3\}$ of an N-ary join operator.

Hereinafter, the evaluation time of each child is assumed as $T_{eval}$, and time spent for sorting the results of $\{S_1,S_2,S_3\}$ of which evaluations have been finished in a given sort order will be assumed as $T_{sort}$. Also, it will be assumed that the query execution apparatus according to an embodiment of the disclosure described with reference to FIG. 11 performs sorting by using a GPU. In this case, time spent for transmitting children to a GPU memory for sorting will be assumed as H2D copy, and the memory sizes after respective evaluations for $\{S_1,S_2,S_3\}$ will be d a s one time, two times, and three times of the available GPU memory size.

Accordingly, the query execution apparatus according to an embodiment of the disclosure may perform sorting for $\{S_1,S_2,S_3\}$ at a GPU in chunk units for sorting $\{S_1,S_2,S_3\}$ with a GPU, and then perform sorting by using a merge sort algorithm at a CPU. In this case, a heterogeneous sort algorithm sorting input data bigger than the GPU memory may be used.

To be more specific, in (a) in FIG. 11, the query execution apparatus may process each of $\{S_1,S_2,S_3\}$ in the order of having smaller result sizes. Afterwards, the query execution apparatus may sort the processing results in the order of result sizes again at 910. This is a method that those having ordinary skill in the pertinent field can easily adopt, and it has the slowest performance among the (a) method to the (b) method.

In (b), the query execution apparatus may overlap processing of $S_{i+1}$ and sorting of $S_i$ at 920. In this case, the query execution apparatus may reduce the sorting time according to the degree that different evaluations are overlapped between different processing apparatuses (e.g., a CPU and a GPU).

According to an embodiment of the disclosure, the query execution apparatus may further reduce the performance time of the (b) method by using the (c) method and the (d) method. Specifically, in the case of using a heterogeneous sort algorithm, if processing results for $S_i$ as large as the sizes of chunks used are gathered greater than or equal to a standard value, the gathered chunks may be sent to the GPU and sorting may be performed. In the case of this embodiment, as the size of the join result becomes bigger, the number of chunks that can be overlapped increases. Thus, much faster performance can be acquired than in the (a) method and the (b) method.

In (c), the query execution apparatus may use a Low Cost Child First (LCF) at 930, and in (d), the query execution apparatus may use High Cost Child First (HCF) at 940. In this case, it is obvious that there is no difference in the performance time between the (c) method and the (d) method. Accordingly, in the case of performing sorting of children in the query execution apparatus according to some embodiments of the disclosure, one or more of the aforementioned (b) method, (c) method, and (d) method may be selected, and according to another embodiment of the disclosure, the query execution apparatus may preferentially select one of the (c) method or the (d) method than the (b) method, and perform a query execution plan including N-ary join operators.

Unlike the (a) method, the (b) method, the (c) method, and the (d) method performed in the query execution apparatus according to some embodiments of the disclosure may not utilize the processing results of $\{S_1,S_2,S_3\}$, but utilize only the meta information of input tables and join columns and determine a sort variable order before processing $\{S_1,S_2, S_3\}$. In particular, join variables mainly utilized by tables in big sizes are made to be selected for sort variables in higher priorities, and accordingly, performance time in sorting and processing of an N-ary join operation can be reduced.

Figure 12:
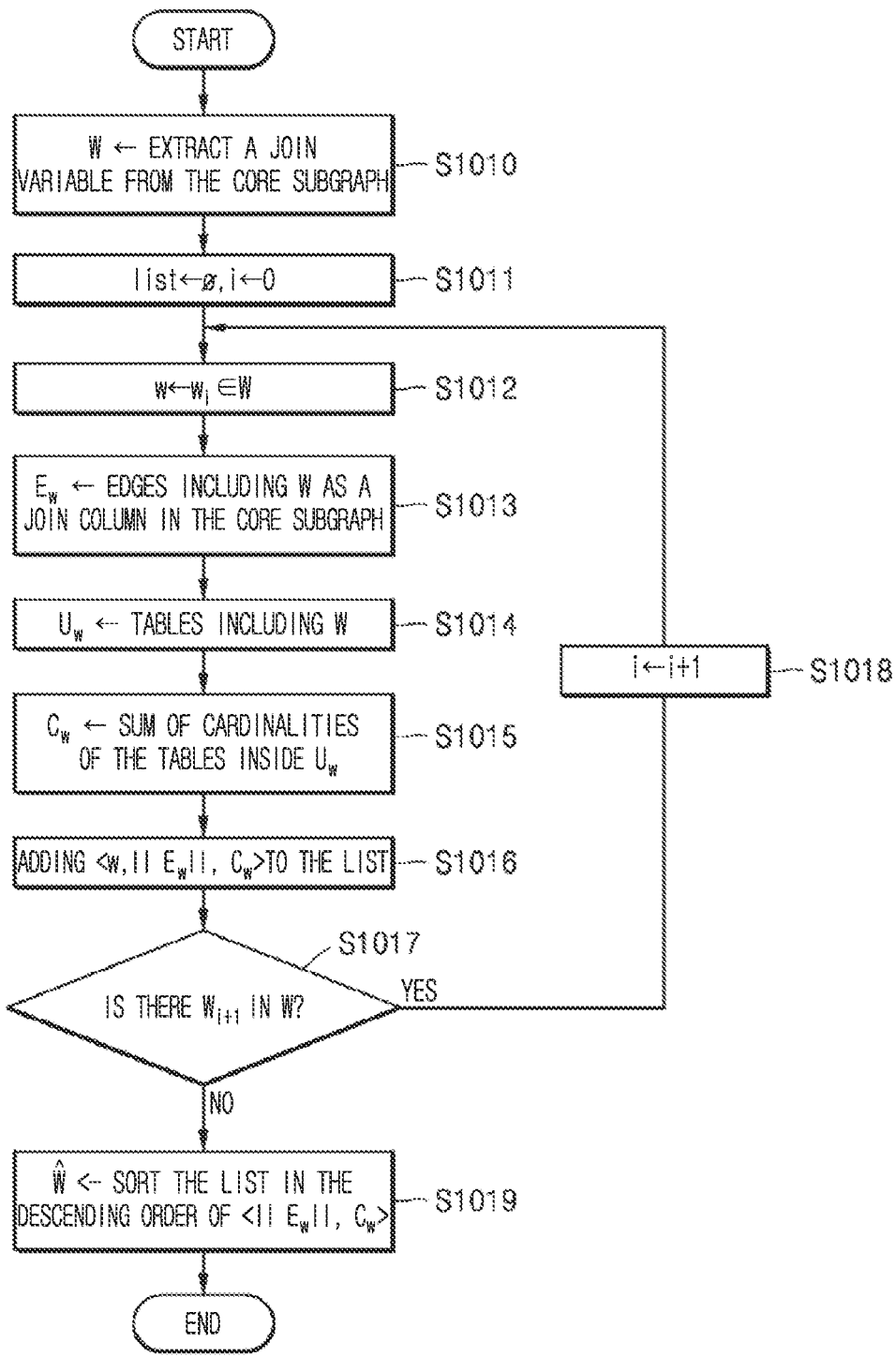
FIG. 12 is a diagram for illustrating a method of determining a sort order of join variables for sorting non-core subgraphs which are children of a core subgraph according to an embodiment of the disclosure.
Figure 13:
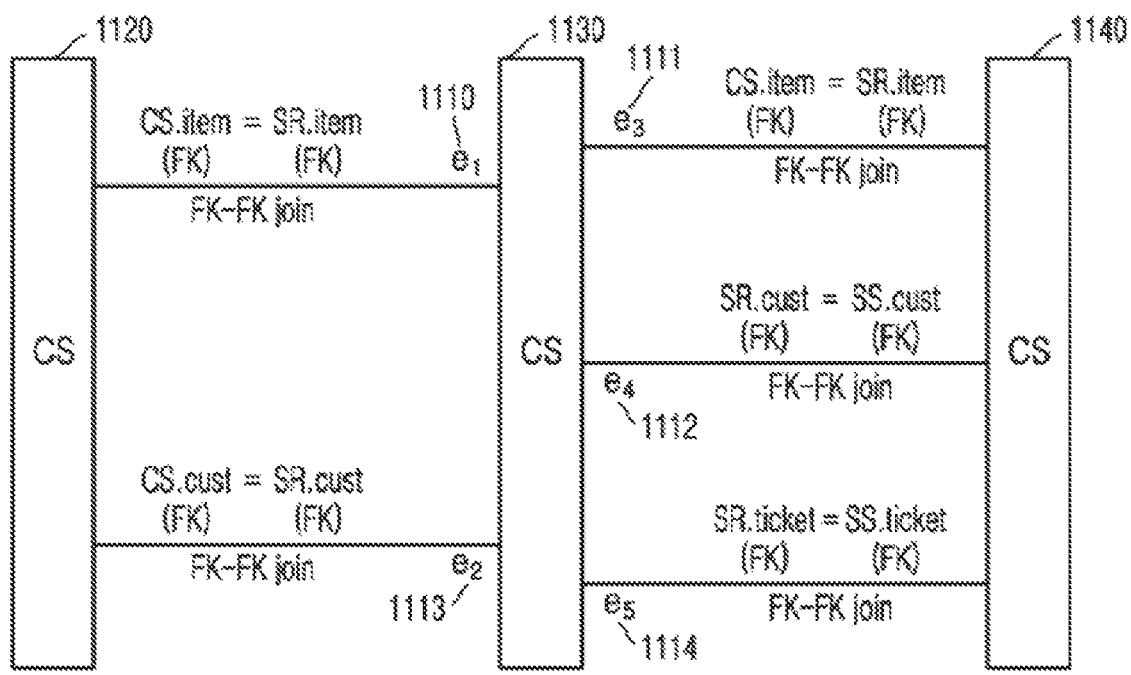
FIG. 13 is an exemplary diagram of a core subgraph according to an embodiment of the disclosure.

FIG. 12 is a diagram for illustrating a method of determining a sort order among join variables for sorting non-core subgraphs which are children of a core subgraph according to an embodiment of the disclosure, and FIG. 13 is an exemplary diagram of a core subgraph according to an embodiment of the disclosure. Hereinafter, FIG. 13 will be referred to for describing FIG. 12 in detail.

FIG. 13 illustrates the core subgraph (core) in FIG. 5. The core subgraph in FIG. 13 may include vertexes 1120, 1130, 1140 corresponding to three tables. Among each table, five edges in total exist (1110, 1111, 1112, 1113, 1114), and the join type of all edges may be an FK-FK join.

At operation S1010 in FIG. 12, the query execution apparatus according to an embodiment of the disclosure may extract all join variables included in a core subgraph that will be processed as an N-ary join operator and store them in any variable w, for acquiring global join variables.

For example, in FIG. 13, three global join variables in total which are an item, a cust, and a ticket are illustrated. According to an embodiment of the disclosure, the query execution apparatus may acquire an item join variable in the edge 1110 and the edge 1111. Specifically, the CS.item and SR.item join columns of the edge 1110 identically refer to the primary key of the item table. Accordingly, the global join variable for the two join columns become the item. Likewise, in the edge 1111, the global join variable item may also be acquired.

In this case, as the number of the aforementioned global join variables is three in total, numbers of cases for sort orders of 8($=2^3$) kinds in total may exist. In this case, if the number of global join variables increases, the cost for selecting the order of the join variables may become geometrically bigger. Accordingly, the query execution apparatus according to some embodiments of the disclosure does not calculate the expected processing costs for all possible sort orders by using a designated statistical value, but determines a sort order swiftly through a heuristic method. Through this, the query execution apparatus according to this embodiment can minimize the processing time for selecting the order of join variables.

At operation S1011, the processing execution apparatus according to an embodiment of the disclosure may initialize the variable i for selecting a specific global join variable, and initialize the list for storing metadata necessary for calculation of a sort order.

Hereinafter, a method of storing metadata necessary for each global join variable in a list will be described with reference to the operation S1012 to the operation S1018.

First, at operation S1012, the query execution apparatus according to an embodiment of the disclosure selects the ith global join variable $w_i$ from W.

At operation S1013, the query execution apparatus according to an embodiment of the disclosure may generate a set of edges $E_w$ using the global variable $w_i$ as a join column among the edges included in the core subgraph. For example, in the case of the global join variable item illustrated in FIG. 13, $E_{item}=(e_1,e_2)$.

At operation S1014, the query execution apparatus according to an embodiment of the disclosure may construct a set of vertexes $U_w$ including the global variable $w_i$ as a join column among the vertexes included in the core subgraph. For example, in the case of the global join variable item illustrated in FIG. 13, $U_{item}=(CS,SR,SS)$.

At operation S1015, the query execution apparatus according to an embodiment of the disclosure obtains a sum $C_w$ of initial cardinalities of vertexes including the global variable $w_i$ as a join column among the vertexes included in the core subgraph. For example, if the cardinalities of the vertex 1120, the vertex 1130, and the vertex 1140 illustrated in FIG. 13 are respectively assumed as 100, 200, and 300, $C_w=100+200+300=600$ for the global join variable item.

At operation S1016, the query execution apparatus according to an embodiment of the disclosure may generate tuples $w,\bigvee|E_w|\bigvee,C_w>$ and add them to the list. Here, the function $\|x\|$ is a cardinality function for x. For example, in the case of the global join variable item illustrated in FIG. 13, $|E_{item}|\bigvee 2$.

At operation S1017, the query execution apparatus according to an embodiment of the disclosure may identify whether there is a global join variable $w_{i+1}$ that was not added to the list.

According to an embodiment of the disclosure, in case a global join variable $w_{i+1}$ that was not added to the list exists, the variable i value may be increased by 1 through the operation S1018, and the operation S1012 to the operation S1017 may be performed again.

According to another embodiment of the disclosure, in case a global join variable $w_{i+1}$ that was not added to the list does not exist, the query execution apparatus may sort the tuples in the list in the descending order of $(|E_w|\bigvee,C_w)$ through the operation S1019, and store the sorted result in W. In this case, as there are more global join variables w included in the edges of the core subgraph, and the sizes of the tables joined in the included edges are bigger, the global join variables may have higher priorities. Afterwards, the query execution apparatus according to an embodiment of the disclosure may sort each child in the order of global join variables corresponding to the first tuple to the last tuple of the set W of which sorting has been finished.

When it is assumed that the sizes of the tables are bigger in the order of SS, CS, and SR, if the operation S1010 to the operation S1019 illustrated in FIG. 12 are performed for the core subgraph in FIG. 13, the global join variables may be sorted in the order of (item, cust, ticket). In this case, in the case of the table 1120 according to an embodiment of the disclosure, the global join variables may be sorted in the order of (item, cust), and in the order of (item, cust, ticket) in the case of the table 1130 according to an embodiment of the disclosure, and in the order of (item, cust, ticket) in the case of the table 1140 according to an embodiment of the disclosure.

Figure 14:
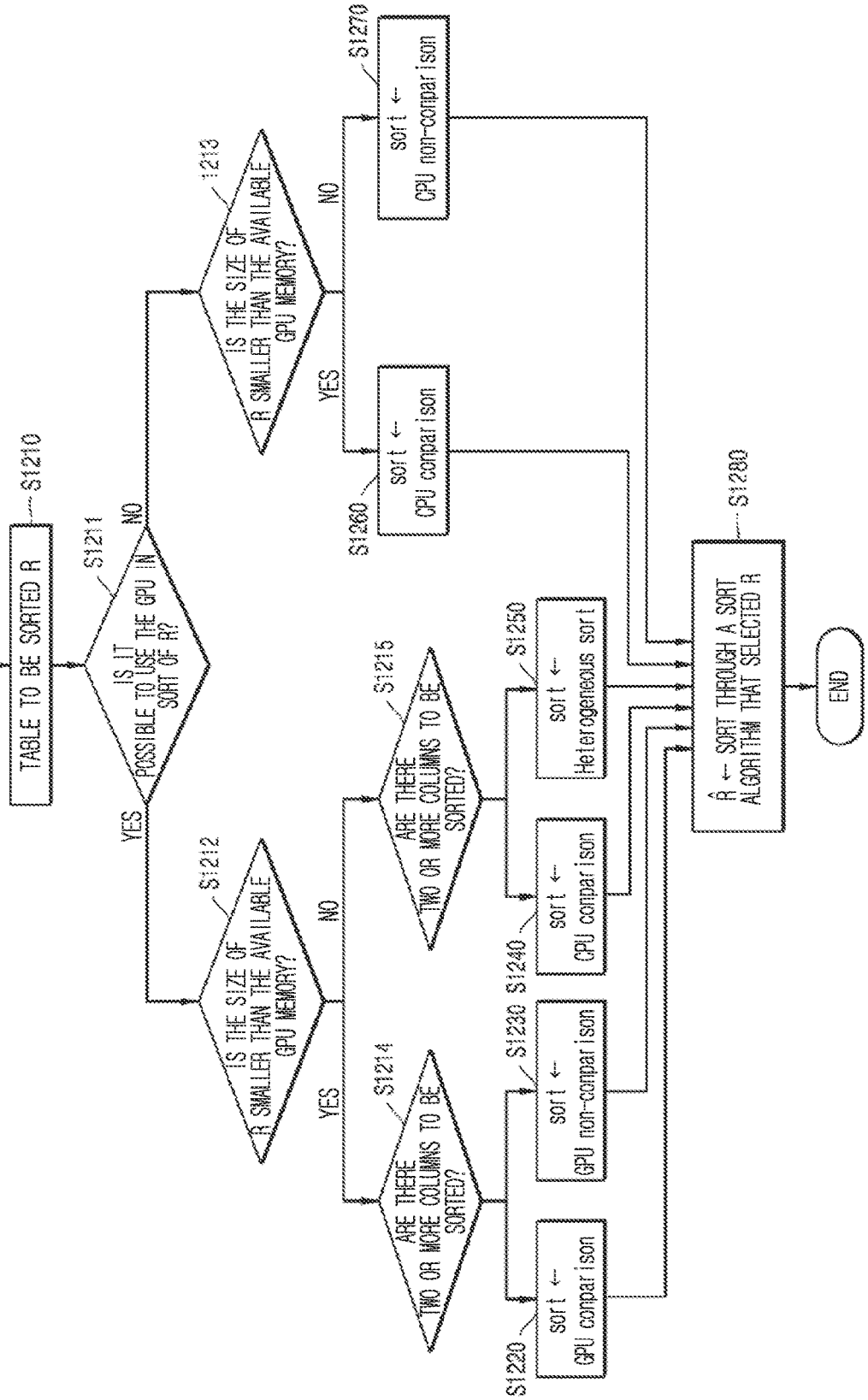
FIG. 14 is a diagram for illustrating a method of selecting a sort algorithm and performing a sort operation according to an embodiment of the disclosure.

FIG. 14 is a diagram for illustrating a method of selecting a sort algorithm and performing a sort operation according to an embodiment of the disclosure.

Specifically, FIG. 14 is a flow chart for selection of a sort algorithm for sorting of the table R. Hereinafter, explanation will be made based on the assumption that the sort order has been designated.

At operation S1211, the query execution apparatus according to an embodiment of the disclosure may identify whether sorting of the table R given at the operation S1210 can be performed at a GPU.

According to an embodiment of the disclosure, the query execution apparatus may perform the operation S1212 in case a GPU is available, and according to another embodiment of the disclosure, in case a GPU is not available in the query execution apparatus, the operation S1213 may be performed.

According to an embodiment of the disclosure, if a GPU is not available in the query execution apparatus, the query execution apparatus according to this embodiment may acquire a sort algorithm using a CPU. To be more specific, the query execution apparatus may identify the number of the join columns of the table R to be sorted at operation S1213, and in case there is one column to be sorted, the query execution apparatus may acquire a non-comparison-based sort algorithm using a CPU at operation S1270.

According to another embodiment of the disclosure, in case the number of columns to be sorted is two or more, the query execution apparatus selects a comparison-based sort algorithm using a CPU at operation S1260.

According to still another embodiment of the disclosure, if a GPU is available in the query execution apparatus, the query execution apparatus may identify whether the size of the table R is smaller than the available GPU memory size at operation S1212. According to an embodiment of the disclosure, the query execution apparatus may perform the operation S1215 in case the table R is smaller than the available GPU memory size, and in an optional embodiment, in case the table R is bigger than the available GPU memory size, the query execution apparatus may perform the operation S1214.

At operation S1214, the query execution apparatus according to an embodiment of the disclosure may, in case the number of the columns to be sorted of the table R is one based on the number of columns to be sorted, perform the operation S1230, and select a non-comparison-based sort algorithm using a GPU. In an optional embodiment, in case the number of the columns to be sorted of the table R is two or more, the query execution apparatus may perform the operation S1220, and select a comparison-based sort algorithm using a GPU.

At operation S1215, the query execution apparatus according to an embodiment of the disclosure may, in case the number of the aforementioned columns to be sorted is one based on the number of columns to be sorted, perform the operation S1250 and acquire a heterogeneous sort algorithm. In an optional embodiment, in case the number of the columns to be sorted of the table R is two or more, the query execution apparatus may perform the operation S1240 and acquire a comparison-based sort algorithm using a CPU. In this case, when the heterogenous sort algorithm performs sorting based on a comparison-based sort algorithm using a GPU, unnecessary processing overhead may occur. For preventing this, the query execution apparatus according to this embodiment may acquire a sort algorithm that uses a CPU instead of a GPU.

At operation S1280, the query execution apparatus according to an embodiment of the disclosure may sort the table R by using the acquired sort algorithm. Afterwards, the query execution apparatus may return the sorted table and finish the process.

Figure 16:
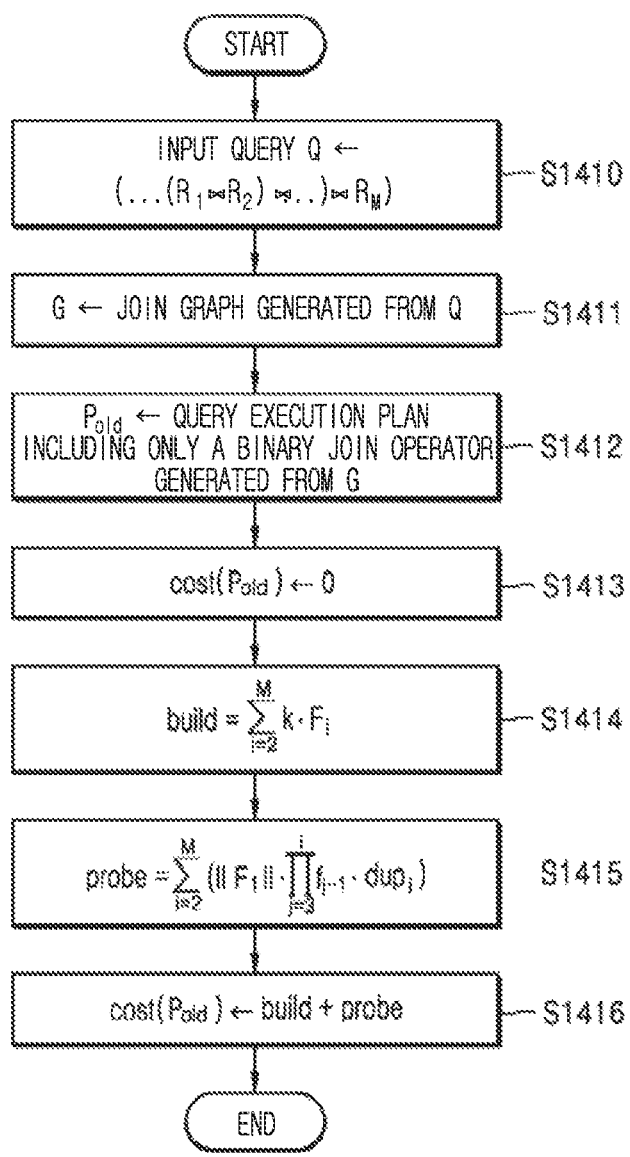
FIG. 16 is a flow chart of a method of calculating a processing cost of a query execution plan including only binary join operations according to an embodiment of the disclosure.
Figure 17:
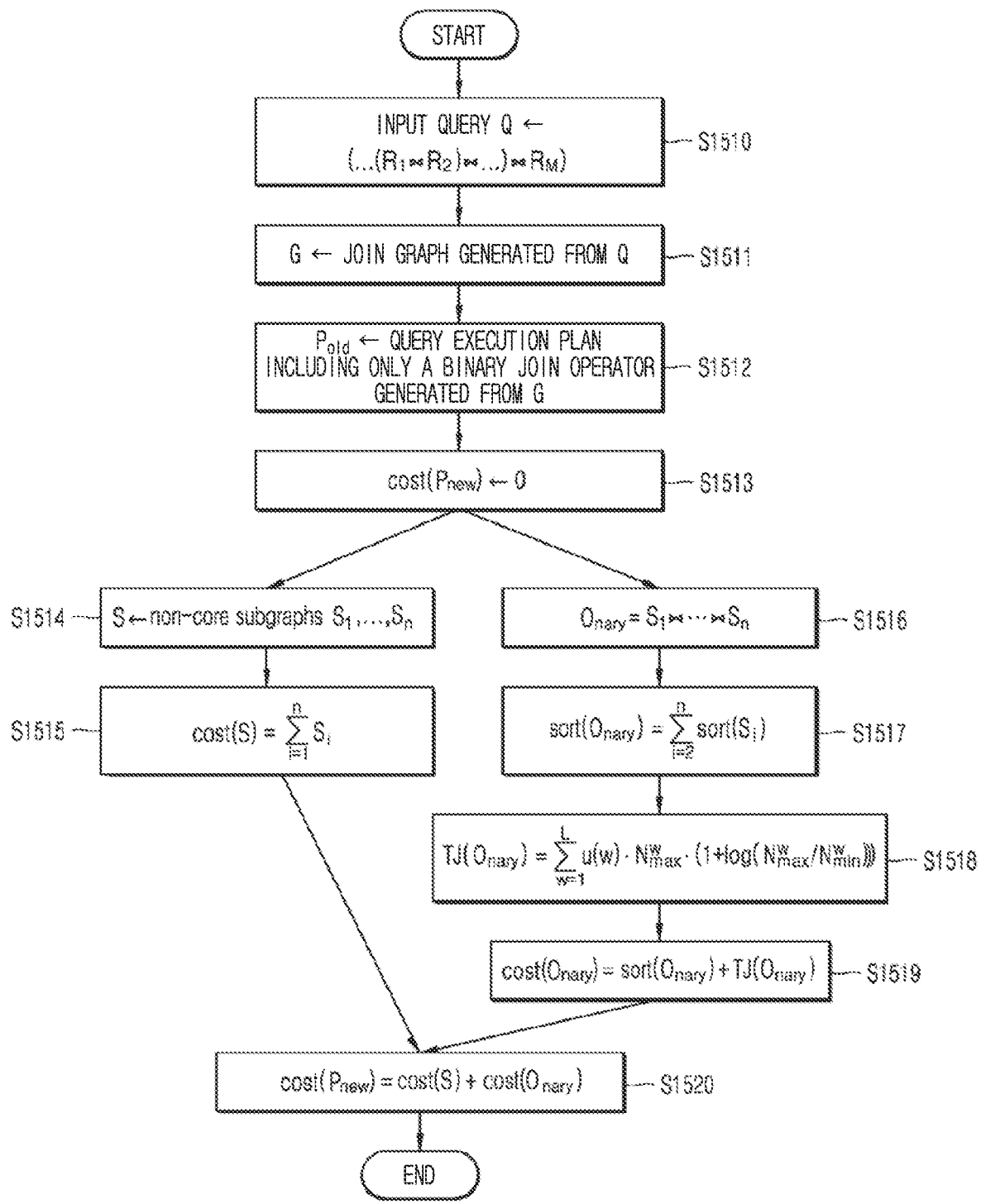
FIG. 17 is a flow chart of a method of calculating a processing cost of a query execution plan including N-ary join operations according to an embodiment of the disclosure.

FIG. 15 is a table for illustrating the meanings of the symbols illustrated in FIG. 16 and FIG. 17.

Meanwhile, it should be noted that the meanings of the symbols described below with reference to FIG. 16 and FIG. 17 may have meanings according to FIG. 15.

FIG. 16 is a flow chart of a method of calculating a processing cost of a query execution plan including only binary join operations according to an embodiment of the disclosure.

Hereinafter, a method of calculating a processing cost of a query execution plan including only binary join operators for an input query Q will be described in detail with reference to FIG. 16. Hereinafter, it will be assumed that a database query processing apparatus processes the input query Q through a pipelining model.

In the method of calculating a processing cost of a query execution plan performed by the query execution apparatus according to an embodiment of the disclosure, the one biggest table among the join tables included in the input query Q may be assumed as a probe table, and all of the remaining tables may be assumed as build tables, and then hash tables of each of the tables may be built. That is, the query execution apparatus may perform probe for all hash tables wherein each tuple of the aforementioned probe table is generated. According to an embodiment of the disclosure, in case a hash table for which there is no probe result exists, the query execution apparatus may not perform probe for the remaining hash tables for the corresponding tuple.

At operation S1410, the query execution apparatus may acquire the input query Q including join operations among tables of an M number. Hereinafter, it will be assumed that the type of the table $R_1$ is a fact table type, and the type of the remaining tables is a dim table type. In this case, the size of the table $R_1$ is the biggest. In this embodiment, the query execution apparatus may process binary join operations by using a hash join algorithm, and may perform probe for hash tables built from tables of an M−1 number $R_2, \ldots, R_M$ by using the table $R_1$.

At operation S1411, the query execution apparatus according to an embodiment of the disclosure may generate a join graph G by using the input query Q.

At operation S1412, the query execution apparatus according to an embodiment of the disclosure may generate a query execution plan $P_{old}$ of a conventional database query processing apparatus using only binary join operators by using the join graph G.

At operation S1413, the query execution apparatus according to an embodiment of the disclosure may initialize cost($P_{old}$) which is the processing cost of the query execution plan $P_{old}$.

At operation S1414, the query execution apparatus according to an embodiment of the disclosure may acquire a sum (build) of costs of generating hash tables of the tables of an M−1 number $R_2, \ldots, R_M$. According to an embodiment of the disclosure, $F_i$ may mean the cardinality of the table after applying selectivity of filter predicates for the table $R_i$ in the query Q for the table $R_i$.

For example, in case the cardinality of the table $R_i$ is 100, and the selectivity of the filter predicates for the table $R_i$ is 0.1, it may be $F_i$=100. According to an embodiment of the disclosure, the constant k is the number of times of scanning a table when generating hash tables. Accordingly, a build cost may be the number of tuples that are accessed when generating hash tables.

At operation S1415, the query execution apparatus according to an embodiment of the disclosure may acquire a cost for the biggest table $R_1$ among the tables of an M number included in the query execution plan $P_{old}$ to probe hash tables of an M−1 number. In this case, the probe cost may be the number of tuples that are accessed when probing hash tables.

According to an embodiment of the disclosure, in case i=2, it means a situation of $R_1 \bowtie R_2$, and the query execution apparatus performs probe for the hash tables of $R_2$ by using tuples as many as $F_1$, $|F_1|\sqrt{}$ which are cardinalities to which filter predicates for $R_1$ have been applied. Here, filter predicates may exist in $R_2$ and thus the query execution apparatus may further perform an operation of multiplying $F_1$ with $f_2$. Afterwards, the query execution apparatus may obtain the total number of tuples that are accessed in probing by multiplying $dup_2$ which is the average number of overlapping key values included in each hash bucket of the hash tables of $R_2$. In conclusion, the probe cost in case i=2 becomes $R_1 \times f_1 \times dup_2$.

According to an embodiment of the disclosure, in case i=3, the query execution apparatus may obtain the number of tuples that are accessed when the result of $R_1 \bowtie R_2$ probes the hash tables of $R_2$. Here, the number of the tuples of $R_1$ that survived after join processing of $R_1 \bowtie R_2$ becomes $R_1 \times f_1 \times f_2$. That is, tuples of $R_1 \times f_1$ probe the hash tables of $R_2$, and thus the result thereof is influenced by the filter predicates that $R_2$ has. Then, the query execution apparatus further performs a multiplication operation by using $dup_1$ which is the degree of overlapping key values that the hash tables of $R_2$ have, and thereby acquire the total number of the tuples that are accessed in case i=3.

According to an embodiment of the disclosure, in case i=4, tuples of $R_1 \times f_1$ are influenced by filter predicates that $R_2$ and $R_4$ have, and thus the number of the tuples of $R_1$ that survived after join processing of $R_1 \bowtie R_2 \bowtie R_3$ becomes $R_1 \times f_1 \times f_2 \times f_3$. In this case, the query execution apparatus may further perform a multiplication operation by using $dup_2$.

At operation S1416, the query execution apparatus may add the build cost (build) for hash tables acquired at the operation S1414 and the probe cost (probe) for hash tables acquired at the operation S1415, and operate $cost(P_{old})=$ build+probe as the query processing cost for the input query Q.

FIG. 17 is a flow chart of a method of calculating a processing cost of a query execution plan including N-ary join operations according to an embodiment of the disclosure.

Hereinafter, it will be assumed that the query execution apparatus according to an embodiment of the disclosure processes binary join operations through a pipelining model for non-core subgraphs including only PK-FK joins for the input query Q, and regarding N-ary join operators, the query execution apparatus processes N-ary join operations through an operator-at-a-time model which is a conventional query processing model.

According to an embodiment of the disclosure, in an operator-at-a-time model, the entire result of the previous join may be an input of the next join operator. In this case, one tuple may be accessed for only one join operation at a time.

At operation S1510, the query execution apparatus according to an embodiment of the disclosure may acquire an input query Q including join operations among tables of an M number.

At operation S1511, the query execution apparatus according to an embodiment of the disclosure may generate a join graph G by using the input query Q. Hereinafter, explanation will be made based on the assumption that the join graph G includes an N-ary join operator $O_{nary}$ for processing non-core subgraphs of an n number $S_1, \ldots, S_n$ and $S_1 \bowtie \ldots \bowtie S_n$.

At operation S1512, the query execution apparatus according to an embodiment of the disclosure may generate a query execution plan $P_{new}$ including N-ary join operators by using the join graph G.

At operation S1513, the query execution apparatus according to an embodiment of the disclosure may initialize $cost(P_{new})$ which is a processing cost of the query execution plan $P_{new}$. According to an embodiment of the disclosure, the processing cost of $P_{new}$ may be acquired by summing up cost(S) which is the processing cost of the non-core subgraphs of an n number $S=\{S_1, \ldots, S_n\}$ that the query execution apparatus acquired at the operation S1514 and $cost(O_{nary})$ which is the processing cost of the N-ary join operator $O_{nary}$ acquired at the operation S1516. Accordingly, according to an embodiment of the disclosure, the query processing cost may be acquired in parallel at the operation S1514 and the operation S1516.

The query execution apparatus according to an embodiment of the disclosure may acquire the processing cost of a set of non-core subgraphs S at the operation S1515. The processing cost of the set of non-core subgraphs may be acquired through the method described above in FIG. 16.

At operation S1517, the query execution apparatus according to an embodiment of the disclosure may calculate $sort(O_{nary})$ which is the cost for sorting sub query results for non-core subgraphs for processing an N-ary join operator. Specifically, the query execution apparatus may operate the sum of the sorting costs of the sort algorithm acquired through the method described above in FIG. 14 for each of the non-core subgraphs $S_1, \ldots, S_n$. Meanwhile, regarding the cost model of each sort algorithm, there would be no problem if any cost model that can be adopted by those having ordinary skill in the pertinent field is adopted.

At operation S1518, the query execution apparatus according to an embodiment of the disclosure may calculate a processing cost of a N-ary join operator for the sorted non-core subgraphs. According to an embodiment of the disclosure, the query execution apparatus may operate an N-ary join operator through a Tributary Join (TJ) algorithm. In this embodiment, the query execution apparatus joins tables for each join variable in consideration of a sort order for global join variables by using a TJ join algorithm, and in case a join result exists in a join variable, the query execution apparatus performs join processing for the join variable corresponding to the next sort order. Afterwards, the query execution apparatus may, in case join results that suit a condition exist for all global join variables, include the join results as results of the N-ary join operator.

Specifically, the query execution apparatus according to an embodiment of the disclosure may obtain processing costs of a TJ algorithm for each join variable in the global join variables of an L number $W=(w_1, \ldots, w_L)$, and then sum up the respective processing costs. In this case, w=1 means the first global join variable $w_1$ among the global join variables $(w_1, \ldots, w_L)$, and $u(w_1)$ means the number of tables including the global join variable $w_1$ as a join column in the FK-FK joins included in the current N-ary join operator. Referring to FIG. 13 again, in the case of the item, the global join variable item is included in the three tables (CS,SR,SS), it may be u(item)=3. Meanwhile, in the case of the global join variable ticket, it is included in only the two tables (SR,SS), it may be u(ticket)=2.

Afterwards, at operation S1518, the query execution apparatus according to an embodiment of the disclosure may obtain $cost(O_{nary})$ which is a probe cost for the join columns of the tables sorted for each global join variable. In this case, the aforementioned probe cost may be in proportion to the number of times of binary searches.

Specifically, the query execution apparatus may perform join processing for the global join variable w as many as the number of the tuples of the table having the minimum cardinalities among the tables included in u(w). In this case, the query execution apparatus may perform binary probes of $N_{min}^w$ times. Also, the cost for each binary probe is $(1+\log(N_{max}^w/N_{min}^w))$, and the cost is an amortized cost when performing binary probes $N_{min}^w$ times.

At operation S1519, the query execution apparatus may acquire $cost(O_{nary})=sort(O_{nary})+TJ(O_{nary})$ which is a cost of summing up sort $(O_{nary})$ which is a sort cost and $TJ(O_{nary})$ which is a join processing cost.

At operation S1520, the query execution apparatus may acquire the entire processing cost of the query execution plan $P_{new}$ for the input query Q by using $cost(P_{new})=cost(S)+cost(O_{nary})$ which is a sum of the costs acquired at the operation S1515 and the operation S1519.

The embodiments according to the disclosure described above may be implemented in the form of a computer program that can be executed through various components in a computer, and such a computer program may be recorded in a computer-readable medium. Here, the medium may include magnetic media like a hard disk, a floppy disk, and a magnetic tape, optical recording media like a CD-ROM and a DVD, magneto-optical media like a floptical disk, and hardware apparatuses that are specifically constructed to store and execute program instructions like a ROM, a RAM, a flash memory, etc.

Meanwhile, computer programs as above may be those that are specifically designed and constructed for the disclosure, or may be those that are known to those skilled in the field of computer software and are usable. Examples of computer programs may include not only machine language codes that are made by a compiler, but also high level language codes that can be executed by a computer by using an interpreter, etc.

The specific embodiments described in the disclosure are merely examples, and they are not intended to limit the scope of the disclosure in any way. For the conciseness of the specification, descriptions of conventional electronic components, control systems, software, and other functional aspects of the above systems may be omitted. Also, connection or connection members of the lines among the components illustrated in the drawings are merely exemplary embodiments of functional connections and/or physical or circuitry connections, and they may be replaced in an actual apparatus, or may be expressed as additional various functional connections, physical connections, or circuitry connections. In addition, if there is no specific mention like "essential," "importantly," etc., they may not be components that are necessarily required for application of the disclosure.

As can be seen above, the disclosure has been described with reference to the embodiments illustrated in the drawings, but the embodiments are merely examples, and those having ordinary skill in the pertinent technical field would be able to understand that various modifications and other equivalent embodiments are possible from the embodiments. Accordingly, the genuine technical scope to be protected of the disclosure should be defined by the technical idea described in the appended claims.

What is claimed is:

1. A method for processing query performed by a computing apparatus, the method comprising:
    acquiring an input query of a database;
    generating a join graph consisting of vertexes corresponding to the tables of the database and edges corresponding to join information among the tables;
    dividing the join graph into a plurality of subgraphs including a first subgraph corresponding to a first join type and a plurality of second subgraphs corresponding to a second join type;
    generating an execution plan of a target query including N-ary join operators by using the plurality of subgraphs based on the input query, the N-ary join operators including an N-ary join operator that corresponds to the first subgraph and has the second subgraphs as children;
    optimizing the execution plan of the target query based on a cost model;
    acquiring a table sort algorithm of the N-ary join operators included in the target query based on an available size of a GPU or CPU memory;
    determining a sort order of one or more join columns included in the tables of the N-ary join operators sorted according to the acquired sort algorithm; and
    based on the sort order of the one or more join columns, performing an operation for the plurality of subgraphs.

2. The method of claim 1,
    wherein the generating a join graph comprises:
    generating the join graph by using join predicate information included in the input query, and
    wherein the join graph includes table type information for the vertexes, and further includes predicate information and join type information for the edges.

3. The method of claim 1,
    wherein the first join type is a foreign-key-foreign-key join type and the second join type is a primary-key-foreign-key join type, and
    wherein the first subgraph consists only of edges corresponding to the foreign-key-foreign-key join type and the second subgraphs include a plurality of edges corresponding to a primary-key-foreign-key join type.

4. The method of claim 3,
    wherein the second subgraphs consist of the plurality of edges corresponding to the primary-key-foreign-key join type, and a common vertex connected with the plurality of edges corresponds to a table of a fact table type.

5. The method of claim 4,
    wherein the generating an execution plan of a target query comprises:
    generating the execution plan of the target query including the N-ary join operators based on the number of the second subgraphs.

6. The method of claim 3,
    wherein the generating an execution plan of a target query comprises:
    based on the number of the first subgraph being one among the plurality of subgraphs, generating sub queries by using each of the plurality of second subgraphs; and
    generating the execution plan of the target query wherein the sub queries are constituted as children of the N-ary join operator corresponding to the first subgraph.

7. The method of claim 6,
    wherein the sub queries are generated, based on there being a plurality of first subgraphs among the plurality of subgraphs, on the basis of a set of edges corresponding to the primary-key-foreign-key join type included in the first subgraphs.

8. The method of claim 7,
    wherein the generating an execution plan of a target query comprises:
    regarding the plurality of first subgraphs, based on a sub query for the jth first subgraph including a vertex within the ith first subgraph existing, generating the execution plan of the target query wherein a sub query generated for the ith first subgraph and its children is constituted as a child of the sub query for the jth first subgraph.

9. The method of claim 6,
    wherein the generating an execution plan of a target query comprises:
    based on remaining queries excluding sub queries corresponding to the plurality of subgraphs existing in the input query, generating an additional sub query corresponding to the remaining queries; and
    generating the execution plan of the target query wherein a sub query for the first subgraph is constituted as a child of the additional sub query.

10. The method of claim 1,
    wherein the optimizing the execution plan of the target query comprises:
    generating a plurality of candidate query execution plans for the target query; and
    operating the processing costs of each of the plurality of candidate query execution plans based on a designated cost model, and acquiring a candidate query execution plan of a minimum processing cost.

11. The method of claim 1,
wherein the acquiring a sort algorithm comprises:
determining whether a GPU is available based on the cardinality of a table, the number of join columns, and whether a GPU apparatus is available for each child table of the N-ary join operator; and
based on a GPU being available, calculating the size of a minimum memory space required for sorting tables by using the cardinality of a table and the sizes of the columns to be sorted of the table; and
comparing the size of the minimum memory space and an available size of a GPU, and acquiring the sort algorithm.

12. The method of claim 11,
wherein the acquiring a sort algorithm comprises:
based on the size of the minimum memory space being bigger than an available size of a GPU and there being one column to be sorted, acquiring a heterogeneous sort algorithm.

13. The method of claim 11,
wherein the acquiring a sort algorithm comprises:
based on the size of the minimum memory space being bigger than an available size of a GPU and there being a plurality of columns to be sorted, acquiring a comparison-based sort algorithm based on a CPU apparatus.

14. The method of claim 11,
wherein the acquiring a sort algorithm comprises:
based on a GPU being available, and the size of the minimum memory space being smaller than an available size of a GPU for all child tables, and there being one column to be sorted necessary for each child table, acquiring a non-comparison-based sort algorithm based on a GPU apparatus.

15. The method of claim 11,
wherein the acquiring a sort algorithm comprises:
based on a GPU being available, and the size of the minimum memory space being smaller than an available size of a GPU for all child tables, and there being a plurality of columns to be sorted, acquiring a comparison-based sort algorithm based on a GPU apparatus.

16. The method of claim 11,
wherein the acquiring a sort algorithm comprises:
based on a GPU not being available, and there being one column to be sorted necessary for each child table, acquiring a non-comparison-based sort algorithm based on a CPU apparatus.

17. The method of claim 11,
wherein the acquiring a sort algorithm comprises:
based on a GPU not being available, and there being a plurality of columns to be sorted necessary for each child table, acquiring a comparison-based sort algorithm based on a CPU apparatus.

18. A method for processing query performed by a computing apparatus, the method comprising:
acquiring an input query of a database;
generating a join graph consisting of vertexes corresponding to the tables of the database and edges corresponding to join information among the tables;
dividing the join graph into a plurality of subgraphs;
generating an execution plan of a target query including N-ary join operators by using the plurality of subgraphs based on the input query;
optimizing the execution plan of the target query based on a cost model;
acquiring a table sort algorithm of the N-ary join operators included in the target query based on an available size of a GPU or CPU memory;
determining a sort order of one or more join columns included in the tables of the N-ary join operators sorted according to the acquired sort algorithm; and
based on the sort order of the one or more join columns, performing an operation for the plurality of subgraphs,
wherein the plurality of subgraphs comprise:
a first subgraph consisting only of edges corresponding to a foreign-key-foreign-key join type and a second subgraph including edges corresponding to a primary-key-foreign-key join type, and
the determining a sort order of one or more join columns comprises:
extracting one or more global join variables for the first subgraph;
with respect to each of the extracted one or more global join variables w, calculating a sum $C_w$ of a set $E_w$ of edges including the global join variables as join columns in the join graph, a set $U_w$ of vertexes including the global join variables, and cardinalities of the database tables corresponding to the vertexes;
acquiring tuples w,$\sqrt{E_w}$,$\sqrt{C_w}$> corresponding to each of the one or more global join variables w, and sorting the acquired one or more tuples based on a value; and
based on the sorted tuples, determining a sort order among global join variables corresponding to each tuple, and determining a sort order of one or more join columns including each of the global join variables.

19. The method of claim 18,
wherein the performing an operation for the plurality of subgraphs comprises:
determining a processing order among a plurality of sub queries included in one or more second subgraphs; and
according to the determined processing order among the plurality of sub queries, performing execution of the plurality of sub queries and sorting of the execution results of the plurality of sub queries in parallel.

20. The method of claim 19,
wherein the performing execution of the plurality of sub queries and sorting of the execution results of the plurality of sub queries in parallel according to the determined processing order among the plurality of sub queries comprises:
based on the size of data of the execution results of the sub queries $S_i$ being smaller than the GPU memory size, performing sorting of the data of the execution results of the sub queries $S_i$ and execution of the next sub query $S_{i+1}$ in parallel by using a GPU; and
based on the size of data of the execution results of the sub queries $S_i$ being bigger than the GPU memory size, performing sorting of intermediate result data of sort units (chunks) of a heterogeneous sort algorithm and execution of the sub queries $S_i$ in parallel by using a GPU.

* * * * *